United States Patent
Sabat, Jr. et al.

(10) Patent No.: US 10,321,328 B2
(45) Date of Patent: *Jun. 11, 2019

(54) MULTIPROTOCOL ANTENNA SYSTEM FOR MULTIPLE SERVICE PROVIDERS

(71) Applicant: CommScope Technologies LLC, Hickory, NC (US)

(72) Inventors: John Sabat, Jr., Merrimack, NH (US); Peter Yelle, Chelmsford, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,744

(22) Filed: Dec. 14, 2017

(65) Prior Publication Data

US 2018/0115910 A1   Apr. 26, 2018

Related U.S. Application Data

(63) Continuation of application No. 14/016,713, filed on Sep. 3, 2013, now Pat. No. 9,867,052, which is a
(Continued)

(51) Int. Cl.
*H04W 4/00* (2018.01)
*H04W 16/14* (2009.01)
(Continued)

(52) U.S. Cl.
CPC ......... *H04W 16/14* (2013.01); *H04W 92/045* (2013.01); *H04W 92/12* (2013.01);
(Continued)

(58) Field of Classification Search
CPC ..... H04W 16/14; H04W 88/10; H04W 88/14; H04W 92/02; H04W 92/045;
(Continued)

(56) References Cited

U.S. PATENT DOCUMENTS

| 4,183,054 A | 1/1980 | Patisaul et al. |
| 4,451,916 A | 5/1984 | Casper et al. |

(Continued)

FOREIGN PATENT DOCUMENTS

| CA | 2215079 A1 | 3/1999 |
| CA | 2306327 A1 | 4/2000 |

(Continued)

OTHER PUBLICATIONS

U.S. Patent and Trademark Office, "Notice of Allowance", U.S. Appl. No. 13/614,408, dated Jun. 3, 2013, pp. 1-6, Published: US.
(Continued)

*Primary Examiner* — Joseph Arevalo
(74) *Attorney, Agent, or Firm* — Fogg & Powers LLC

(57) ABSTRACT

A radio access node is configured to digitize a first analog radio frequency signal in order to generate first digital data indicative of the first analog radio frequency signal and is configured to digitize a second analog radio frequency signal in order to generate second digital data indicative of the second analog radio frequency signal. The first analog radio frequency signal is broadcast from a first mobile unit using wireless service provided by a first wireless service provider. The second analog radio frequency signal is broadcast from a second mobile unit using wireless service provided by a second wireless service provider. The first and second digital data are transported from the radio access node to the base unit using a shared transport medium. The base unit is configured to produce information derived from the first digital data and the second digital data that is used in performing base station processing for the first mobile unit and the second mobile unit.

62 Claims, 10 Drawing Sheets

Related U.S. Application Data continuation of application No. 13/614,408, filed on Sep. 13, 2012, now Pat. No. 8,559,939, which is a continuation of application No. 13/433,771, filed on Mar. 29, 2012, now Pat. No. 8,290,483, which is a continuation of application No. 13/033,337, filed on Feb. 23, 2011, now Pat. No. 8,160,570, which is a continuation of application No. 12/817,706, filed on Jun. 17, 2010, now Pat. No. 7,920,858, which is a continuation of application No. 11/098,941, filed on Apr. 5, 2005, now Pat. No. 7,761,093, which is a continuation of application No. 09/818,986, filed on Mar. 27, 2001, now Pat. No. 6,963,552.

(60) Provisional application No. 60/192,186, filed on Mar. 27, 2000.

(51) Int. Cl.
  *H04W 92/04* (2009.01)
  *H04W 92/12* (2009.01)
  *H04W 88/10* (2009.01)
  *H04W 88/14* (2009.01)
  *H04W 92/02* (2009.01)
  *H04W 92/14* (2009.01)

(52) U.S. Cl.
  CPC ............ *H04W 88/10* (2013.01); *H04W 88/14* (2013.01); *H04W 92/02* (2013.01); *H04W 92/14* (2013.01)

(58) Field of Classification Search
  CPC ....... H04W 92/12; H04W 92/14; H04W 4/18; H04J 2203/0028; H04L 1/0083; H04L 1/1835
  USPC ..... 455/450, 511, 522, 560, 562.1, 20, 12.1, 455/561, 22
  See application file for complete search history.

(56) References Cited

U.S. PATENT DOCUMENTS

| | | |
|---|---|---|
| 4,611,323 A | 9/1986 | Hessenmuller |
| 4,628,501 A | 12/1986 | Loscoe |
| 4,654,843 A | 3/1987 | Roza et al. |
| 4,691,292 A | 9/1987 | Rothweiler |
| 4,726,644 A | 2/1988 | Mathis |
| 4,755,795 A | 7/1988 | Page |
| 4,813,054 A | 3/1989 | Plumb |
| 4,999,831 A | 3/1991 | Grace |
| 5,193,109 A | 3/1993 | Chien-Yeh |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,381,459 A | 1/1995 | Lappington |
| 5,400,391 A | 3/1995 | Emura et al. |
| 5,457,557 A | 10/1995 | Zarem et al. |
| 5,461,627 A | 10/1995 | Rypinski |
| 5,513,176 A | 4/1996 | Dean et al. |
| 5,519,691 A | 5/1996 | Darcie et al. |
| 5,533,011 A | 7/1996 | Dean et al. |
| 5,546,397 A | 8/1996 | Mahany |
| 5,566,168 A | 10/1996 | Dent |
| 5,579,341 A | 11/1996 | Smith et al. |
| 5,592,470 A * | 1/1997 | Rudrapatna ........ H04B 7/18578 370/320 |
| 5,619,202 A | 4/1997 | Wilson et al. |
| 5,621,730 A | 4/1997 | Kelley |
| 5,621,786 A | 4/1997 | Fischer et al. |
| 5,627,879 A | 5/1997 | Russell et al. |
| 5,642,405 A | 6/1997 | Fischer et al. |
| 5,644,622 A | 7/1997 | Russell et al. |
| 5,657,374 A | 8/1997 | Russell et al. |
| 5,682,256 A | 10/1997 | Motley et al. |
| 5,732,076 A | 3/1998 | Ketseoglou et al. |
| 5,748,683 A | 5/1998 | Smith et al. |
| 5,761,619 A | 6/1998 | Danne et al. |
| 5,771,449 A | 6/1998 | Blasing et al. |
| 5,781,541 A | 7/1998 | Schneider |
| 5,781,859 A | 7/1998 | Beasley |
| 5,781,865 A * | 7/1998 | Gammon ........... H01Q 21/0025 333/132 |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,818,883 A | 10/1998 | Smith et al. |
| 5,822,324 A | 10/1998 | Kostresti et al. |
| 5,835,487 A * | 11/1998 | Campanella ....... H04B 7/18523 370/316 |
| 5,852,651 A | 12/1998 | Fischer et al. |
| 5,898,680 A * | 4/1999 | Johnstone ............ H04B 10/118 340/995.1 |
| 5,907,544 A | 5/1999 | Rypinski |
| 5,930,682 A | 7/1999 | Schwartz et al. |
| 5,966,442 A * | 10/1999 | Sachdev ................ H04H 20/62 370/321 |
| 5,969,837 A | 10/1999 | Farber et al. |
| 5,987,014 A | 11/1999 | Magill et al. |
| 6,005,506 A | 12/1999 | Bazarjani et al. |
| 6,005,884 A | 12/1999 | Cook et al. |
| 6,014,366 A | 1/2000 | Ichiyoshi |
| 6,034,950 A | 3/2000 | Sauer et al. |
| 6,047,162 A * | 4/2000 | Lazaris-Brunner .... H04H 40/90 455/12.1 |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,128,471 A | 10/2000 | Quelch et al. |
| 6,157,659 A | 12/2000 | Bird |
| 6,188,693 B1 | 2/2001 | Murakami |
| 6,222,660 B1 | 4/2001 | Traa |
| 6,226,274 B1 | 5/2001 | Reese et al. |
| 6,253,094 B1 | 6/2001 | Schmutz |
| 6,307,877 B1 | 10/2001 | Philips et al. |
| 6,353,600 B1 | 3/2002 | Schwartz et al. |
| 6,356,369 B1 | 3/2002 | Farhan |
| 6,373,611 B1 | 4/2002 | Farhan et al. |
| 6,373,887 B1 | 4/2002 | Aiyagari et al. |
| 6,377,640 B2 | 4/2002 | Trans |
| 6,411,616 B1 * | 6/2002 | Donahue ............ H04B 7/18595 370/201 |
| 6,498,936 B1 | 12/2002 | Raith |
| 6,504,831 B1 * | 1/2003 | Greenwood ..... H04B 10/25755 340/505 |
| 6,567,473 B1 | 5/2003 | Tzannes |
| 6,594,496 B2 | 7/2003 | Schwartz |
| 6,667,973 B1 | 12/2003 | Gorshe et al. |
| 6,674,966 B1 | 1/2004 | Koonen |
| 6,697,603 B1 | 2/2004 | Lovinggood et al. |
| 6,704,545 B1 | 3/2004 | Wala |
| 6,729,929 B1 | 5/2004 | Sayers et al. |
| 6,731,904 B1 | 5/2004 | Judd |
| 6,745,003 B1 | 6/2004 | Maca et al. |
| 6,768,745 B1 | 7/2004 | Gorshe et al. |
| 6,785,558 B1 * | 8/2004 | Stratford ............... H04L 1/0625 455/522 |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,917,614 B1 | 7/2005 | Laubach et al. |
| 6,963,552 B2 * | 11/2005 | Sabat, Jr. .............. H04W 16/14 370/338 |
| 7,127,175 B2 | 10/2006 | Mani et al. |
| 7,205,864 B2 | 4/2007 | Schultz, Jr. et al. |
| 7,215,651 B2 | 5/2007 | Millar |
| 7,257,328 B2 | 8/2007 | Levinson et al. |
| 7,289,972 B2 | 10/2007 | Rieser et al. |

(56) References Cited

U.S. PATENT DOCUMENTS

| | | | |
|---|---|---|---|
| RE40,564 | E | 11/2008 | Fischer et al. |
| 7,610,046 | B2 | 10/2009 | Wala |
| 7,761,093 | B2 | 7/2010 | Sabat, Jr. et al. |
| 7,848,747 | B2 | 12/2010 | Wala |
| 7,920,858 | B2 | 4/2011 | Sabat, Jr. et al. |
| 8,160,570 | B2 | 4/2012 | Sabat, Jr. et al. |
| 8,290,483 | B2 | 10/2012 | Sabat, Jr. et al. |
| RE43,964 | E | 2/2013 | Fischer et al. |
| 8,446,530 | B2 | 5/2013 | Bellers |
| 8,559,939 | B2 | 10/2013 | Sabat, Jr. et al. |
| RE45,321 | E | 1/2015 | Fischer et al. |
| 9,332,402 | B2 | 5/2016 | Wala |
| 9,867,052 | B2 | 1/2018 | Sabat, Jr. et al. |
| 2001/0017849 | A1* | 8/2001 | Campanella ....... H04B 7/18526 370/326 |
| 2002/0072329 | A1 | 6/2002 | Bandeira et al. |
| 2002/0167954 | A1 | 11/2002 | Highsmith et al. |
| 2002/0191565 | A1 | 12/2002 | Mani et al. |
| 2003/0043928 | A1 | 3/2003 | Ling et al. |
| 2003/0157943 | A1 | 8/2003 | Sabat, Jr. |
| 2004/0010609 | A1 | 1/2004 | Vilander et al. |
| 2004/0037565 | A1 | 2/2004 | Young et al. |
| 2004/0198453 | A1 | 10/2004 | Cutrer et al. |
| 2004/0219950 | A1 | 11/2004 | Pallonen et al. |
| 2005/0007993 | A1 | 1/2005 | Chambers et al. |
| 2005/0147067 | A1 | 7/2005 | Mani et al. |
| 2005/0201323 | A1 | 9/2005 | Mani et al. |
| 2005/0250503 | A1 | 11/2005 | Cutrer |
| 2006/0121944 | A1 | 6/2006 | Buscaglia et al. |
| 2006/0193295 | A1 | 8/2006 | White et al. |
| 2016/0248508 | A1 | 8/2016 | Wala |

FOREIGN PATENT DOCUMENTS

| | | |
|---|---|---|
| EP | 0368673 A1 | 5/1990 |
| EP | 0391597 A2 | 10/1990 |
| EP | 0633705 A2 | 1/1995 |
| EP | 0642243 A1 | 3/1995 |
| EP | 0876073 A2 | 11/1998 |
| EP | 1047276 A2 | 4/2000 |
| EP | 1032143 A2 | 8/2000 |
| EP | 2290850 A1 | 3/2011 |
| EP | 3035562 A1 | 6/2016 |
| GB | 2253770 A | 9/1992 |
| GB | 2289198 A | 11/1995 |
| GB | 2315959 A | 2/1998 |
| GB | 2320653 A | 6/1998 |
| WO | 9115927 A1 | 10/1991 |
| WO | 9428690 A1 | 12/1994 |
| WO | 9533350 A1 | 12/1995 |
| WO | 9628946 A1 | 9/1996 |
| WO | 9629834 A1 | 9/1996 |
| WO | 9716000 A1 | 5/1997 |
| WO | 9732442 A1 | 9/1997 |
| WO | 9824256 A2 | 6/1998 |
| WO | 9837715 A2 | 8/1998 |
| WO | 9937035 A1 | 7/1999 |
| WO | 9948312 A1 | 9/1999 |
| WO | 0156197 A2 | 8/2001 |
| WO | 0174013 A2 | 10/2001 |
| WO | 0174100 A1 | 10/2001 |

OTHER PUBLICATIONS

U.S. Patent and Trademark Office, "Notice of Allowance", U.S. Appl. No. 14/016,713, dated Jan. 26, 2016, pp. 1-11, Published: US.

U.S. Patent and Trademark Office, "Notice of Allowance", U.S. Appl. No. 14/016,713, dated Feb. 9, 2017, pp. 1-13, Published: US.

U.S. Patent and Trademark Office, "Notice of Allowance", U.S. Appl. No. 14/016,713, dated May 18, 2016, pp. 1-9, Published: US.

U.S. Patent and Trademark Office, "Notice of Allowance", U.S. Appl. No. 14/016,713, dated May 23, 20167, pp. 1-18, Published: US.

U.S. Patent and Trademark Office, "Notice of Allowance", U.S. Appl. No. 14/016,713, dated Aug. 10, 2015, pp. 1-9, Published: US.

U.S. Patent and Trademark Office, "Notice of Allowance", U.S. Appl. No. 14/016,713, dated Sep. 7, 2017, pp. 1-12, Published: US.

U.S. Patent and Trademark Office, "Notice of Allowance", U.S. Appl. No. 14/016,713, dated Oct. 26, 2016, pp. 1-8, Published: US.

U.S. Patent and Trademark Office, "Notice of Panel Decision from Pre-Appeal Brief Review", U.S. Appl. No. 11/098,941, dated Feb. 17, 2009, pp. 1-2, Published: US.

U.S. Patent and Trademark Office, "Office Action", U.S. Appl. No. 09/818,986, dated Oct. 15, 2004, pp. 1-18, Published: US.

U.S. Patent and Trademark Office, "Office Action", U.S. Appl. No. 11/098,941, dated Mar. 6, 2009, pp. 1-11, Published: US.

U.S. Patent and Trademark Office, "Office Action", U.S. Appl. No. 11/098,941, dated Dec. 28, 2007, pp. 1-24, Published: US.

U.S. Patent and Trademark Office, "Office Action", U.S. Appl. No. 13/033,337, dated Aug. 30, 2011, pp. 1-19, Published: US.

U.S. Patent and Trademark Office, "Office Action", U.S. Appl. No. 13/614,408, dated Jan. 2, 2013, pp. 1-24, Published: US.

U.S. Patent and Trademark Office, "Office Action", U.S. Appl. No. 14/016,713, dated Apr. 21, 2015, pp. 1-26, Published: US.

Wala, "A New Microcell Architecture Using Digital Optical Transport, Freedom Through Wireless Technology", May 18, 1993, pp. 585-588, Publisher: Proceedings of the Vehicular Technology Conference, New York, IEEE, Published in: US.

Zhaohui et al., "A RAKE Type Receiver Structure for CDMA Mobile Communication Systems Using Antenna Arrays", 1996, pp. 1-3, IEEE.

Lin et al., "Heterogeneous Personal Communications Services: Integration of PCS Systems", IEEE Communications Magazine, Sep. 1996, pp. 106-112, IEEE.

ADC Kentrox, "ADC Kentrox Expands RF Technology Base with Acquisition of Waseca Technology Inc.", Jun. 9, 1993, pp. 1-2, ADC Telecommunications, Inc.

"Dali Wireless, Inc.'s Preliminary Invalidity Contentions to Commscope Technologies LLC—Exhibit A", *Commscope Technologies LLC v. Dali Wireless, Inc. v. Commscope Connectivity LLC*, No. 3:16-cv-477, "United States District Court for the Northern District of Texas Dallas Division", Mar. 13, 2017, pp. 1-27, Published in: US.

"Dali Wireless, Inc.'s Preliminary Invalidity Contentions to Commscope Technologies LLC—Exhibit B", *Commscope Technologies LLC v. Dali Wireless, Inc. v. Commscope Connectivity LLC*, No. 3:16-cv-477, "United States District Court for the Northern District of Texas Dallas Division", Mar. 13, 2017, pp. 1-200, Published in: US.

"Dali Wireless, Inc.'s Preliminary Invalidity Contentions to Commscope Technologies LLC—Exhibit C", *Commscope Technologies LLC v. Dali Wireless, Inc. v. Commscope Connectivity LLC*, No. 3:16-cv-477, "United States District Court for the Northern District of Texas Dallas Division", Mar. 13, 2017, pp. 1-410, Published in: US.

"Dali Wireless, Inc.'s Preliminary Invalidity Contentions to Commscope Technologies LLC—Exhibit D", *Commscope Technologies LLC v. Dali Wireless, Inc. v. Commscope Connectivity LLC*, No. 3:16-cv-477, "United States District Court for the Northern District of Texas Dallas Division", Mar. 13, 2017, pp. 1-613, Published in: US.

"Dali Wireless, Inc.'s Preliminary Invalidity Contentions to Commscope Technologies LLC—Exhibit E", *Commscope Technologies LLC v. Dali Wireless, Inc. v. Commscope Connectivity LLC*, No. 3:16-cv-477, "United States District Court for the Northern District of Texas Dallas Division", Mar. 13, 2017, pp. 1-482, Published in: US.

"Dali Wireless, Inc.'s Preliminary Invalidity Contentions to Commscope Technologies LLC—Exhibit F", *Commscope Technologies LLC v. Dali Wireless, Inc. v. Commscope Connectivity LLC*, No. 3:16-cv-477, "United States District Court for the Northern District of Texas Dallas Division", Mar. 13, 2017, pp. 1-573, Published in: US.

"Dali Wireless, Inc.'s Preliminary Invalidity Contentions to Commscope Technologies LLC", *Commscope Technologies LLC v. Dali Wireless, Inc. v. Commscope Connectivity LLC*, No. 3:16-cv-

(56) References Cited

OTHER PUBLICATIONS

477, "United States District Court for the Northern District of Texas Dallas Division", Mar. 13, 2017, pp. 1-23, Published in: US.

"Digital AMPS", Wikipedia, retrieved on Sep. 24, 2018, pp. 1-7, https://en.wikipedia.org/wiki/Digital_AMPS.

Analog Devices, Inc., "Mixed-Signal Design Seminar", 1991, pp. 1-3, U.S.

"Personal communications network", Wikipedia, retrieved on Oct. 8, 2018, p. 1 https://en.wikipedia.org/wiki/Personal_communications_network.

"Star network", Wikipedia, retrieved on Oct. 4, 2018, pp. 1-2, https://en.wikipedia.org/wiki/Star_network.

"Tektronix Synchronous Optical Network (SONET)", "http://www.iec.org/online/tutorials/sonet/topic03.html", Aug. 28, 2002, Publisher: International Engineering Consortium.

ADC Telecommunications, Inc., "Widen Your Horizons To A World of Solutions", pp. 1-8.

Brunner, "On Space-Time Rake Receiver Structures for WCDMA", 1999, pp. 1-6, IEEE.

Canadian Intellectual Property Office, "Notice of Allowance from CA Application No. 2442597 dated Mar. 2, 2011", from Foreign Counterpart to U.S. Appl. No. 09/818,986, dated Mar. 2, 2011, p. 1 Published: CA.

Canadian Intellectual Property Office, "Office Action from CA Application No. 2442597 dated Jan. 9, 2008", from Foreign Counterpart to U.S. Appl. No. 09/818,986, dated Jan. 9, 2008, pp. 1-5, Published: CA.

Canadian Intellectual Property Office, "Office Action from CA Application No. 2442597 dated May 25, 2010", from Foreign Counterpart to U.S. Appl. No. 09/818,986, dated May 25, 2010, pp. 1-2, Published: CA.

Cheun, "Performance of Direct-Sequence Spread-Spectrum RAKE Receivers with Random Spreading Sequences", IEEE Transactions on Communications, dated Sep. 1997, pp. 1-14, vol. 45, No. 9, IEEE.

Crofut, "Remote monitoring of wireless base stations", Jun. 1, 1998, pp. 1-4, www.urgentcomm.com/mag/remote-monitoring-wireless-base-stations.

Cyr et al., "The digital age is here; Digital radio frequency transport enhances cellular network performance", Telephony, Jul. 5, 1993, pp. 1-5.

"CityCell 824 Host-Site User Manual", Sep. 25, 1993, pp. 1-108.

ADC Kentrox, "CityCell 824, Remote-Site Manual: Preliminary Version", Feb. 1, 1993, pp. 1-105, Publisher: ADC Kentrox.

European Patent Office, "Communication pursuant to Article 94(3) from EP Application No. 01920800.8 dated Apr. 18, 2008", from Foreign Counterpart to U.S. Appl. No. 15/842,744, dated Apr. 18, 2008, pp. 1-5, Published: EP.

European Patent Office, "Communication pursuant to Article 94(3) from EP Application No. 09162278.7 dated May 21, 2010", from Foreign Counterpart to U.S. Appl. No. 15/842,744, dated May 21, 2010, pp. 1-3, Published: EP.

European Patent Office, "Communication pursuant to Article 94(3) from EP Application No. 09162278.7 dated Aug. 2, 2011", from Foreign Counterpart to U.S. Appl. No. 15/842,744, dated Aug. 2, 2011, pp. 1-7, Published: EP.

European Patent Office, "Communication under Rule 71(3) from EP Application No. 01920800.8 dated Jan. 27, 2009", from Foreign Counterpart to U.S. Appl. No. 15/842,744, dated Jan. 27, 2009, pp. 1-4, Published: EP.

European Patent Office, "Communication under Rule 71(3) from EP Application No. 09162278.7 dated Jul. 27, 2012", from Foreign Counterpart to U.S. Appl. No. 15/842,744, dated Jul. 27, 2012, pp. 1-4, Published: EP.

European Patent Office, "Communication under Rule 71(3) from EP Application No. 11168006.2 dated May 23, 2012", from Foreign Counterpart to U.S. Appl. No. 15/842,744, dated May 23, 2012, pp. 1-6, Published: EP.

European Patent Office, "Extended European Search Report from EP Application No. 09162278.7 dated Sep. 11, 2009", from Foreign Counterpart to U.S. Appl. No. 15/842,744, dated Sep. 11, 2009, pp. 1-11, Published: EP.

European Patent Office, "Extended European Search Report from EP Application No. 11168006.2 dated Aug. 4, 2011", from Foreign Counterpart to U.S. Appl. No. 15/842,744, dated Aug. 4, 2011, pp. 1-7, Published: EP.

Federal Patent Court, Munich, "Reply received in the invalidity matter of EP Patent No. 2094058 dated Oct. 8, 2018" From Foreign Counterpart of U.S. Appl. No. 09/818,986; pp. 1-77; Published in DE.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher. IEEE.

Graf, "Modern Dictionary of Electronics", Newnes, 1991, pp. 1-9, Butterworth-Heinemann.

Grundmann et al., "An Empirical Comparison of a Distributed Antenna Microcell System Versus a Single Antenna Microcell System for Indoor Spread Spectrum Communications at 1.8 GHz", University of Calgary and Telecommunications Research Laboratories, 1993, pp. 1-5, IEEE.

Harvey et al., "Cordless Communications Utilising Radio Over Fibre Techniques for the Local Loop", "IEEE International Conference on Communications", Jun. 1991, pp. 1171-1175, Publisher: IEEE.

International Preliminary Examining Authority, "International Preliminary Report on Patentability from PCT Application No. PCT/US01/09724 dated Jun. 26, 2002", from Foreign Counterpart to U.S. Appl. No. 09/818,986, dated Jun. 26, 2002, pp. 1-14, Published: EP.

International Preliminary Examining Authority, "Written Opinion from PCT Application No. PCT/US01/09724 dated Mar. 4, 2002", from Foreign Counterpart to U.S. Appl. No. 09/818,986, dated Mar. 4, 2002, pp. 1-2, Published: EP.

International Preliminary Examining Authority, "Written Opinion from PCT Application No. PCT/US01/09724 dated May 7, 2002", from Foreign Counterpart to U.S. Appl. No. 09/818,986, dated May 7, 2002, pp. 1-6, Published: EP.

International Searching Authority, "International Search Report from PCT Application No. PCT/US01/09724 dated Aug. 22, 2001", from Foreign Counterpart to U.S. Appl. No. 09/818,986, dated Aug. 22, 2001, pp. 1-3, Published: EP.

Federal Patent Court, Munich, "Reply received in the invalidity matter of EP Patent No. 1269776 dated Oct. 8, 2018" From Foreign Counterpart of U.S. Appl. No. 09/818,986; pp. 1-54; Published in DE.

U.S. Patent and Trademark Office, "Advisory Action", U.S. Appl. No. 11/098,941, dated Nov. 12, 2009, pp. 1-3, Published: US.

U.S. Patent and Trademark Office, "Final Office Action", U.S. Appl. No. 11/098,941, dated Jul. 10, 2008, pp. 1-18, Published: US.

U.S. Patent and Trademark Office, "Final Office Action", U.S. Appl. No. 11/098,941, dated Aug. 20, 2009, pp. 1-16, Published: US.

U.S. Patent and Trademark Office, "Notice of Allowance", U.S. Appl. No. 09/818,986, dated Jun. 16, 2005, pp. 1-7, Published: US.

U.S. Patent and Trademark Office, "Notice of Allowance", U.S. Appl. No. 11/098,941, dated Mar. 9, 2010, pp. 1-12, Published: US.

U.S. Patent and Trademark Office, "Notice of Allowance", U.S. Appl. No. 12/817,706, dated Nov. 23, 2010, pp. 1-31, Published: US.

U.S. Patent and Trademark Office, "Notice of Allowance", U.S. Appl. No. 13/033,337, dated Dec. 16, 2011, pp. 1-16, Published: US.

U.S. Patent and Trademark Office, "Notice of Allowance", U.S. Appl. No. 13/433,771, dated Jun. 26, 2012, pp. 1-31, Published: US.

* cited by examiner

Simulcast Varied to Equalize Reverse Link Budgets
and to Balance With Forward Link Budget

| | CDMA | TDMA | GSM1900 |
|---|---|---|---|
| Reverse Link | | | |
| Mobile Transmit Power | 23 dBm | 23 dBm | 30 dBm |
| RAN Sensitivity | -120 dBm | -111 dBm | -110 dBm |
| Allowable Reverse Path Loss without Simulcast | 143 dB | 139 dB | 140 dB |
| Number in Simulcast | 8 | 3 | 4 |
| Allowable Reverse Path Loss with Simulcast | 134 dB | 134 dB | 134 dB |
| Forward Link | | | |
| RAN Transmit Power per Traffic Channel | 20 dBm | 32 dBm | 32 dBm |
| Mobile Sensitivity less Interference Margin | -114 dBm | -102 dBm | -102 dBm |
| Allowable Forward Path Loss | 134 dB | 134 dB | 134 dB |

FIG. 5

MULTIPROTOCOL ANTENNA SYSTEM FOR MULTIPLE SERVICE PROVIDERS

RELATED APPLICATIONS

This application is a continuation of U.S. patent application Ser. No. 14/016,713, filed Sep. 3, 2013, which is a continuation of U.S. patent application Ser. No. 13/614,408, filed Sep. 13, 2012, which issued as U.S. Pat. No. 8,559,939, which is a continuation of U.S. patent application Ser. No. 13/433,771, filed Mar. 29, 2012, which issued as U.S. Pat. No. 8,290,483, which is a continuation of U.S. patent application Ser. No. 13/033,337, filed Feb. 23, 2011, which issued as U.S. Pat. No. 8,160,570, which is a continuation of U.S. patent application Ser. No. 12/817,706 filed Jun. 17, 2010, which issued as U.S. Pat. No. 7,920,858, which is a continuation of U.S. patent application Ser. No. 11/098,941, filed Apr. 5, 2005, which issued as U.S. Pat. No. 7,761,093, which, in turn, is a continuation of U.S. patent application Ser. No. 09/818,986, filed Mar. 27, 2001, which issued as U.S. Pat. No. 6,963,552, which claims the benefit of U.S. Provisional Application Ser. No. 60/192,186, filed on Mar. 27, 2000, all of which are incorporated herein by reference.

BACKGROUND

The wireless telecommunication industry continues to experience significant growth and consolidation. In the United States, market penetration is near 32% with approximately 86 million users nationwide. In 1999 the total number of subscribers increased 25% over the previous year, with the average Minutes of Use (MOU) also increasing by about 20% per user. If one considers growth in the digital market, in as short as three years, the digital subscriber base has grown to 49 million users, or approximately equal to the installed number of users of analog legacy systems. Even more interesting is an observation by Verizon Mobile that 70% of their busy hour traffic (an important system design parameter) is digital traffic, although only approximately 40% of the total number of their subscribers are digital users. The Verizon Mobile observation indicates the digital subscriber will drive the network design through its increasing usage, whereas the analog user is truly a passive "glovebox" subscriber.

Similar growth has been witnessed in other countries, especially in Northern and Western Europe, where market penetration is even higher, approaching 80% in some areas, and digital service is almost exclusively used.

With the availability of Personal Communications Service (PCS) frequencies in the United States, and additional continuing auctions of spectrum outside of the traditional 800-900 MegaHertz (MHz) radio band, the past few years have also seen increased competition among service providers. For example, it has also been estimated that 88% of the US population has three or more different wireless service providers from which to choose, 69% have five or more, and about 4% have as many as seven service providers in their local area.

In 1999 total wireless industry revenue increased to $43 B, representing an approximate 21% gain over 1998. However, a larger revenue increase would have been expected given the increased subscriber count and usage statistics. It is clear that industry consolidation, the rush to build out a nationwide footprint by multiple competing service providers, and subsequent need to offer competitive pricing plans has had the effect of actually diminishing the dollar-per-minute price that customers are willing to pay for service.

These market realities have placed continuing pressure on system designers to provide system infrastructure at minimum cost. Radio tower construction companies continue to employ several business strategies to serve their target market. One approach, their historical business strategy, is build-to-suit (i.e., at the specific request and location as specified by a wireless operator). But some have now taken speculation approach, where they build a tower and then work with local government authorities to force new service providers to use the already existing towers. This speculation build approach, spawned by the zoning by-law backlash, is actually encouraged by communities to mitigate the "unsightly ugliness" of cellular phone towers. This is seemingly the best alternative, since Federal laws no longer permit local zoning authorities to completely ban the deployment of wireless infrastructure in a community. Often the shared tower facility is zoned far removed from residential areas, in more commercialized areas of town, along heavily traveled roads, or in more sparsely populated rural sections. But providing such out of the way locations for towers often does not fully address each and every wireless operator's capacity or coverage need.

Each of the individual wireless operators compete for the household wireline replacement, and as their dollar-per-MOU is driven down due to competition in the "traditional" wireless space, the "at home" use is one of the last untapped markets.

As the industry continues to consolidate, the wireless operator will look for new ways to offer enhanced services (coverage or products) to maintain and capture new revenue.

Considering the trends that have appeared over recent years, when given the opportunity to displace the household wireline phone with reliable wireless service, a wireless service operator may see their average MOUs increase by a factor of 2 to 4, thereby directly increasing their revenue potential 200 to 400%. In order to achieve this, the wireless operator desires to gain access throughout a community as easily as possible, in both areas where wireless facilities are an allowed use and in where they are not, and blanket the community with strong signal presence.

SUMMARY

Certain solutions are emerging that provide an alternative to the tower build out approach. In particular, wireless signal distribution systems employ a distribution media such as a cable television infrastructure or optical fiber data network to distribute Radio Frequency (RF) signals. This allows the capacity of a single base station to be distributed over an area which is the equivalent of multiple traditional cellular sites without degradation in coverage or call quality.

However, even these systems have a shortcoming in that they are typically built out for one selected over the air protocol and are controlled by a single service provider. Thus, even with such systems as they are presently known, it becomes necessary to build out and overlay multiple base stations and multiple signal distribution networks for multiple service providers.

The present invention is an open access signal distribution system in which a variety of wireless voice, data and other services and applications are supported. The open access systems makes use of a distributed Radio Frequency (RF) distribution network and associated network entities that enable the system operator to employ a wireless infrastructure network that may be easily shared among multiple wireless service providers in a given community. The open access system provides the ability for such operators and service providers to share the infrastructure regardless of the specific RF air interface or other signal formatting and/or managing messaging formats that such operators choose to deploy.

In one configuration, the present invention consists of a system in which a base station interface located at a central hub location converts radio frequency signals associated with multiple base stations, of the same or even different wireless service providers, to and from a transport signaling format. A shared transport medium, such as a fiber optic data network or the like is then used for transporting the converted signals from the hub location to a number of remote access node locations.

The access node locations each have Radio Access Node equipment located therein. The Radio Access Nodes (RANs) are each associated with a particular coverage area. The RANs have within them a number of slice modules, with each slice module containing equipment that converts the radio signals required for a particular service provider to and from the transport signaling format.

In a preferred embodiment, the transport medium may be an optical fiber telecommunications network such as provided through the SONET type digital frame formatting. In such a configuration, the SONET data formatting is arranged so that certain data frames are associated with the slices in a given Radio Access Node on a time slotted basis. In such a configuration, signal down converter modules convert the radio frequency signals associated with each base station to an Intermediate Frequency (IF) signal. Associated analog to digital (A/D) modules also located at the hub then convert the Intermediate Frequency signals to digital signals suitable for handling by a transport formatter that formats the converted digital signals to the proper framing format for the SONET digital transport.

Other transport media may be used such as Internet Protocol (IP) over Digital Wavelength Division Multiplexing (DWDM).

In one other aspect the invention concerns the aggregation of different Radio Frequency (RF) signaling formats onto a common transport mechanism. In this embodiment, a first and second base station operate according to respectively, first and second different wireless system air interfaces. A transport medium interface converts the radio frequency signals transmitted by the first and second base stations to a common transport medium. The first and second base station may optionally also be operated under the control of two different service providers. In this arrangement, a plurality of remotely located Radio Access Nodes (RANs) each provide radio signal coverage to a predetermined portion of a total system coverage area. Each Radio Access Node is coupled to receive signals from the common transport medium. Each Radio Access Node also contains a first and second slice module associated with the respective one of the first and/or second base station. Each slice module contains a suite of radio transmitter, amplifier and antenna equipment as required by its associated air interface.

In another aspect the present invention concerns equalizing power levels of Radio Frequency signals radiated by the Radio Access Nodes at levels appropriate for respectively different air interfaces. In particular, in such a system a first and second base station are located at a central location and operate according to respectively different wireless system air interfaces. A transport medium interface converts the Radio Frequency signals transmitted by the first and second base stations to a common transport medium signaling format. At a plurality of remote locations Radio Access Nodes (RANs) are located. Each Radio Access Node is coupled to receive signals from the common transport medium. Each Radio Access Node contains at least a first and second slice module that is associated with and responsible for converting signals associated with the first and second base stations.

In this instance, the invention includes means for equalizing the receive sensitivities of the Radio Access Nodes at levels for the appropriate for the respectively different air interfaces, such as by managing the number of RANs in simulcast depending upon the particular air interface.

This configuration permits for example, the deployment for the set of shared RANs at common RAN remote locations without having to deploy multiple RAN locations for different air interfaces even when such air interfaces have different receive sensitivities and coverage distances. Thus the Radio Access Nodes for two or more different air interfaces may be co-located throughout the coverage system area reducing the overall system build out requirements.

In yet another aspect, the present invention is a method for providing access to radio equipment distributed throughout a coverage area to multiple wireless communication service providers. This method involves the steps of accepting requests for radio signal distribution service from the service providers, the request specifying a desired air interface and an indication of which portions of a coverage area the particular air interface is to be supported. The service provider then installs common base station equipment operating with the air interface specified by the service provider at a central location with the base station equipment being co-located with base station equipment specified by other wireless service providers. The commonly located base station equipment is then coupled to receive traffic signals from a signaling network used by the wireless communication service provider, the signaling network carrying such transport formatted Radio Frequency signals over a common transport medium. A data processor then controls the connection of transport signal to specific Radio Access Nodes as specified by the wireless system operator.

DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates the relationship of FIGS. 3A and 3B.

FIG. 5 shows one example of a calculation to determine how simulcast operation can be coordinated to equalize a reverse link budget and provide balancing with a forward link budget.

DETAILED DESCRIPTION

A description of preferred embodiments of the invention follows.

Figure 1:
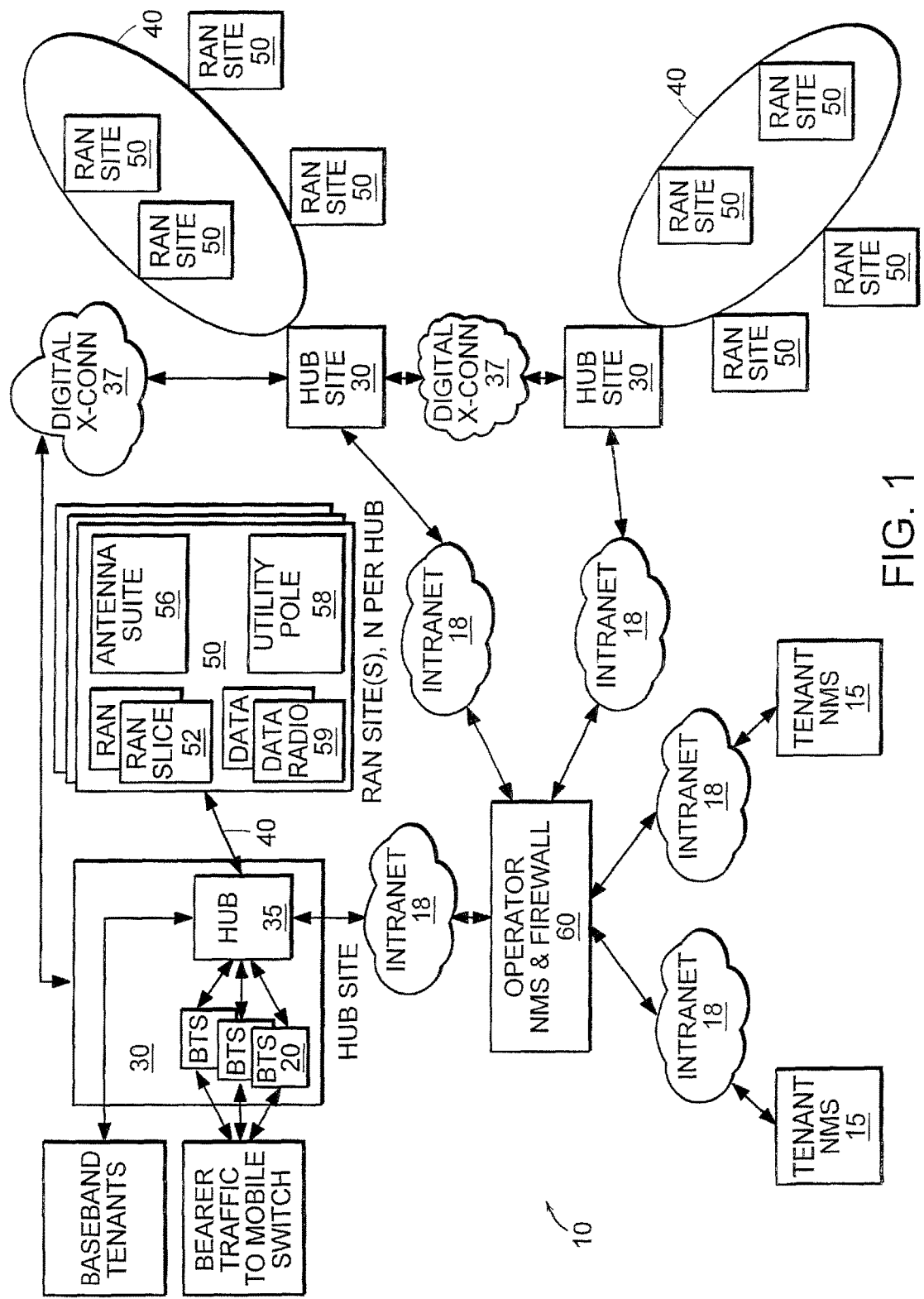
FIG. 1 is a block diagram of an open access system according to the invention.

While this invention has been particularly shown and described with references to preferred embodiments thereof, it will be understood by those skilled in the art that various changes in form and details may be made therein without departing from the scope of the invention encompassed by the appended claims. Turning attention now to the drawings more particularly, FIG. 1 is a diagram of an open access system 10. The open access system 10 is an open access network supporting a multitude of wireless voice, data, video services and applications. Wireless Service Providers (WSP) and Wireless Internet Service (WISP) Providers, commonly known as tenants, may use open access system 10 to either enhance or replace existing networks, wired or wireless, or to develop new networks.

Open access system 10 is a multi-frequency, multi-protocol Radio Frequency (RF) access network, providing cellular, Personal Communication Services (PCS), and wireless data coverage via a distributed RF access system. Open access system 10 is comprised of base stations 20, located at hub sites 30. The base stations 20 are connected via high speed datalinks 40 to distributed RF access nodes (RANs) 50. The system 10 is, in effect, a signal distribution network and associated management entities that enable a network operator to deploy a wireless infrastructure network that may easily be shared among multiple wireless system operators in a given community. The open access network may be shared regardless of the specific RF air interface formatting and management messaging formats that each wireless operator chooses to deploy.

Figure 2:
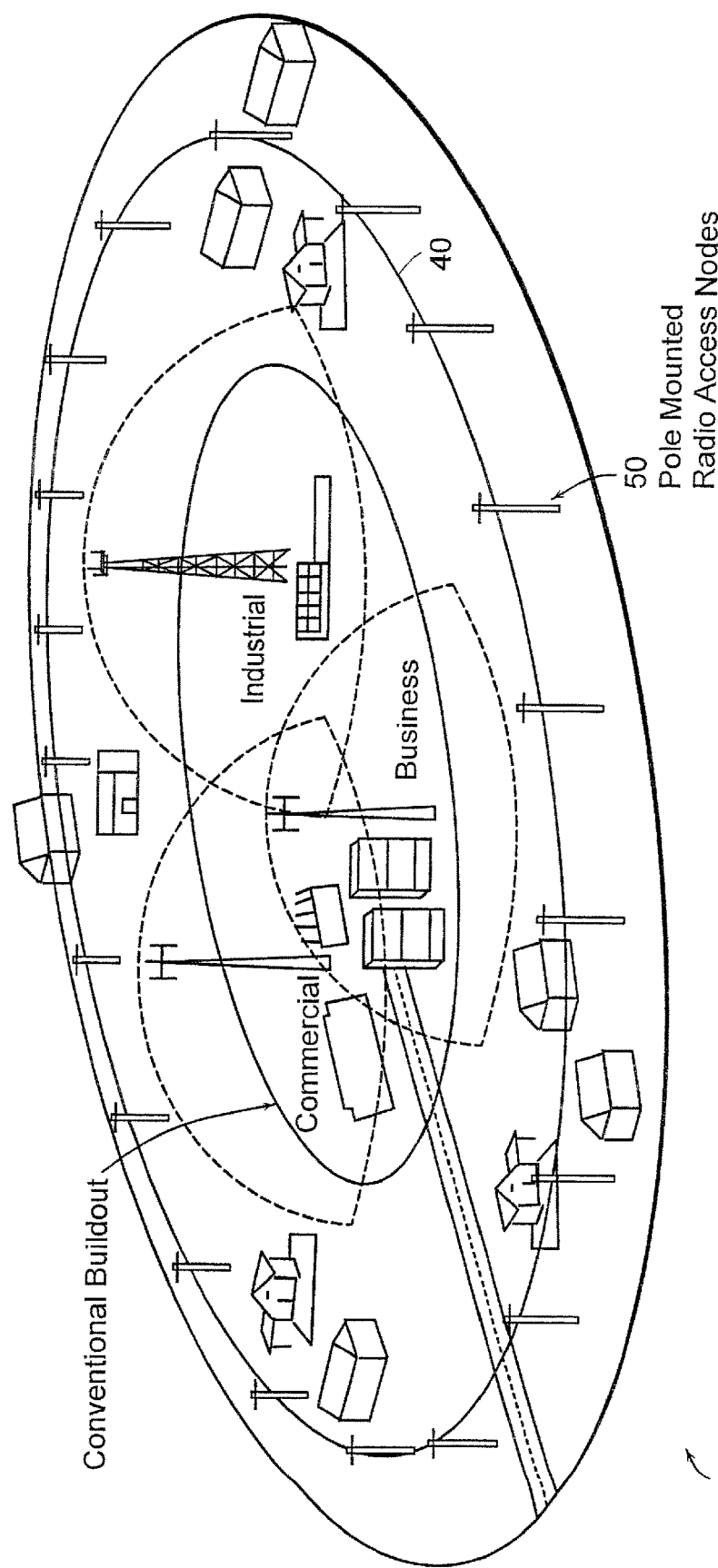
FIG. 2 illustrates one possible deployment for the open access system.

FIG. 2 depicts one possible deployment scenario for the open access system 10. As shown, the system consists of a multiple Radio Frequency (RF) Access Node 50 (RAN) units that may be located at relatively lower height locations such as utility poles. The open access network 10 distributes RF signals to and from the RANs, using a shared transport media 40 such as an optical fiber using high speed transport signaling. The physical deployment of the open access system is thus quite different from the higher radio towers required in a conventional system.

Returning attention to FIG. 1, the hub 35 provides the hardware and software interfaces between the high speed data link 40 and the individual wireless carrier base stations 20. The base stations 20 are considered to be original equipment manufacturer (OEM) type equipment to be provided and/or specified by the tenant 15 and are not provided as part of the open access system 10 itself. Hub 35 co-locates with the base stations 20 at a designated hub site 30. In a maximum configuration, a 3-sector base station 20 connects to 24 RAN Units 50, via an open access Hub 35. Hub 35 can be expanded to connect multiple base stations 20 (one or multiple wireless carriers) and their associated RAN Units 50.

RAN units 50 are distributed throughout a given community in accordance with the network operator's RF plan. RAN Units 50, along with associated antennas 56, are typically/installed on utility poles 58, and connect to Hub Unit 35 via a fiber optic cable 40.

Network Management System 60 provides remote monitoring and control of the open access network by the network operator via the open access system 10. Network Management System 60 also allows for the network operator to pass selected control or status information concerning the open access network 10 to or from the individual wireless carriers or tenants. By "tenant" it is meant to refer to the wireless carrier, Wireless Service Provider (WSP), or other business entity that desires to provide wireless service to end customers.

The open access system 10 supports essentially any wireless protocol to be an open Access platform. In one configuration, open access system 10 supports the multiple 800/1900 MHz wireless service providers, and wireless data providers who require last mile access to their targeted customers, all at the same time. In another configuration, open access system 10 supports the lower frequency 400 and 700 MHz bands and the WCS/ISM/MMDS, U-NII wireless data bands.

In a preferred configuration, the open access network consists of radio access nodes (RAN) 50 distributed to achieve the desired RF signal presence and a hub 35 and high speed data link 40, which interconnects the base station RF signals with the RANs 50.

The distributed architecture is comprised of multi-protocol, frequency-independent radio access nodes 50. In the preferred embodiment at the present time, each RAN 50 supports from 1 to 8 operators, commonly referred to as tenants 15, of various protocols and frequencies. It should be understood that other configurations could support a smaller or greater number of tenants per RAN 50. Within each RAN 50, the wireless service provider "tenants" have typically leased space for the service provider to install corresponding individual radio elements in a RAN slice 52. RANs 50 connect to a centralized base station locale 30 where the tenants 15 connect to through an open access HUB 35 to the specific tenant's base station electronics. Each HUB 35 can scale to support one to three sectors of a base stations 20. It should be understood that base stations with a greater number of sectors 20 may also be supported.

RANs 50 are interconnected via fiber links 40 to centrally located HUB sites 30 and associated base stations 20. RANs 50 wide area distribution is logically a "horizontal tower" with access provided to a single "tenant" or shared amongst multiple tenants (wireless service providers). The generic architecture supports scaling from a single operator to supporting up to multiple operators across the multiple frequency bands per shelf. Multiple shelves may be stacked to serve additional tenants, as needed.

HUB 35 and RAN 50 network elements incorporate a System Network Management Protocol (SNMP) communication scheme to facilitate integration with the Host operator's network management system 60. This allows easy and complete communication across the open access system 10 with a high level of control and visibility.

Figure 3A:
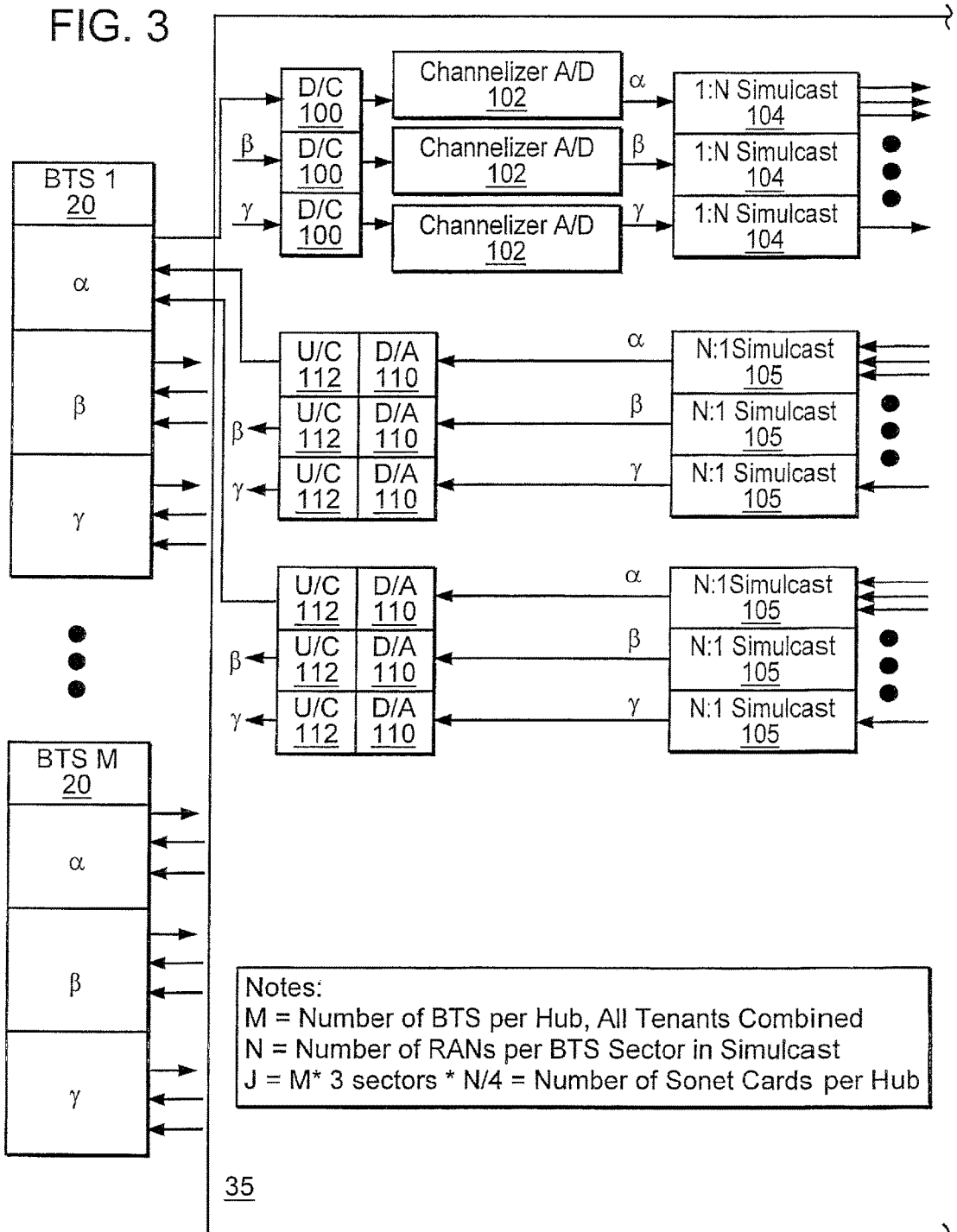
FIGS. 3A and 3B are more detailed diagrams of a hub signal path for the open access system.
Figure 3B:
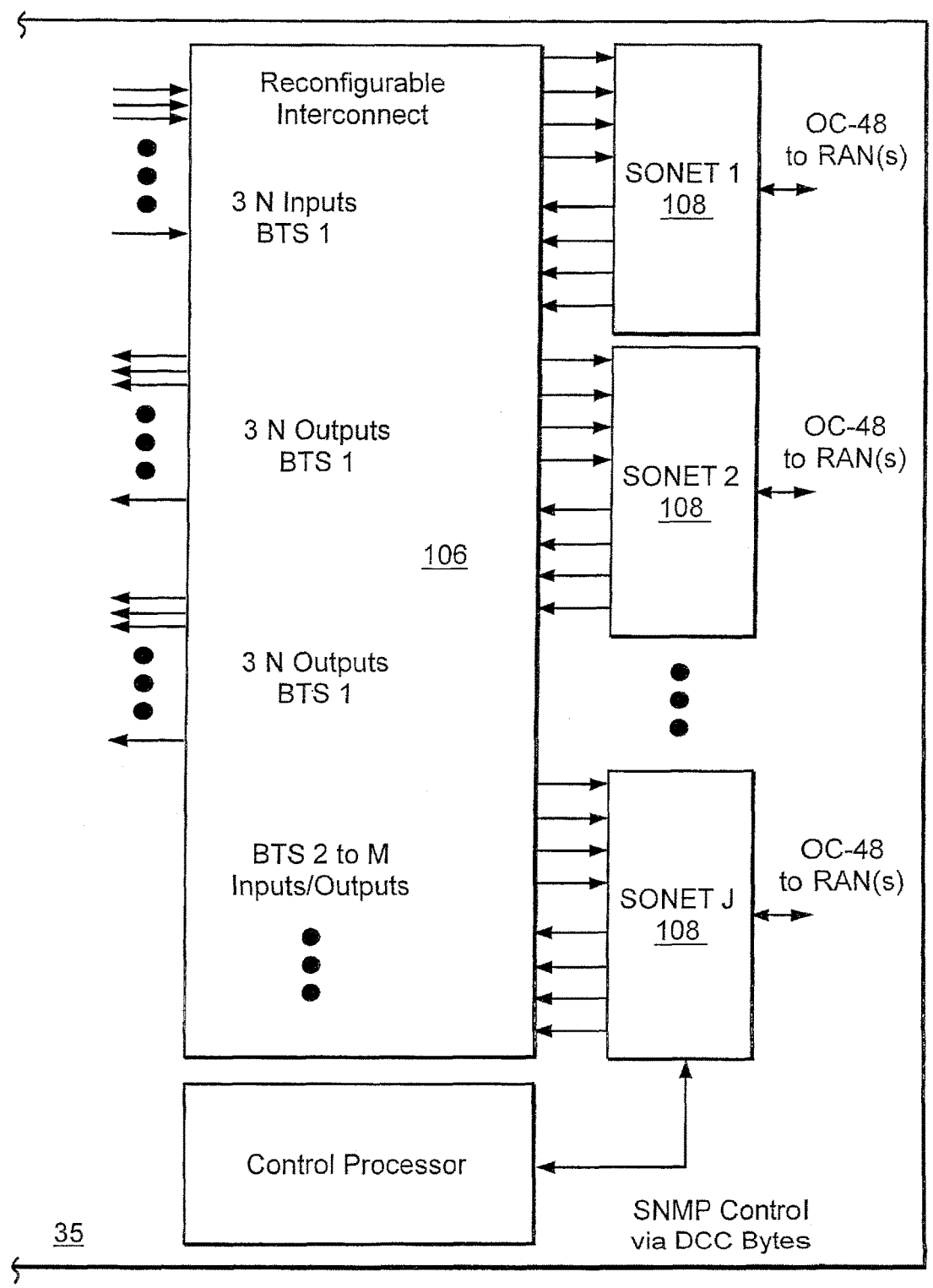

Referring now to FIG. 3, an RF signal is transmitted from a BTS 20 to open access hub 35. The RF signal is of any bandwidth up to typically 15 MHz (future bandwidths may be greater) and follows the hub signal path as shown in FIG. 3. The signal is down converted to a 50 MHz (+/−7.5 MHz) Intermediate Frequency (IF) signal by the down converter (D/C) 100. The IF signal is then converted to a 14 byte stream, at least at 42.953 Msps, by analog-to-digital (A/D) channelizer 102. Two control bits are added to the stream at a field programmable gate array (FPGA) within the A/D channelizer 102. The 16 byte stream, still at 42.953 Msps, is then serialized using 8 B/10 B encoding producing a 859 Mbps bit stream or an STS-12 type transport signal. The STS-12 signal is then distributed along a number of paths equal to the number of RANs in simulcast for each BTS sector. The STS-12 signal is preferably transmitted to the designated RAN Units 50 by interconnect 106 cross-connecting the STS-12 signal to a 4:1 multiplexer 108 that converts the STS-12 signal to an OC-48 signal. In a preferred embodiment, as shown in FIG. 1, a base station 20 located at any hub site 30 can transmit its associated signal to any RAN Unit 50 using a digital cross-connect 37 connected between Hubs 35. In one example, lower rate signals (STS-3, 4, etc.) may be combined into higher rate shared transport signals (e.g. OC-192).

Figure 4:
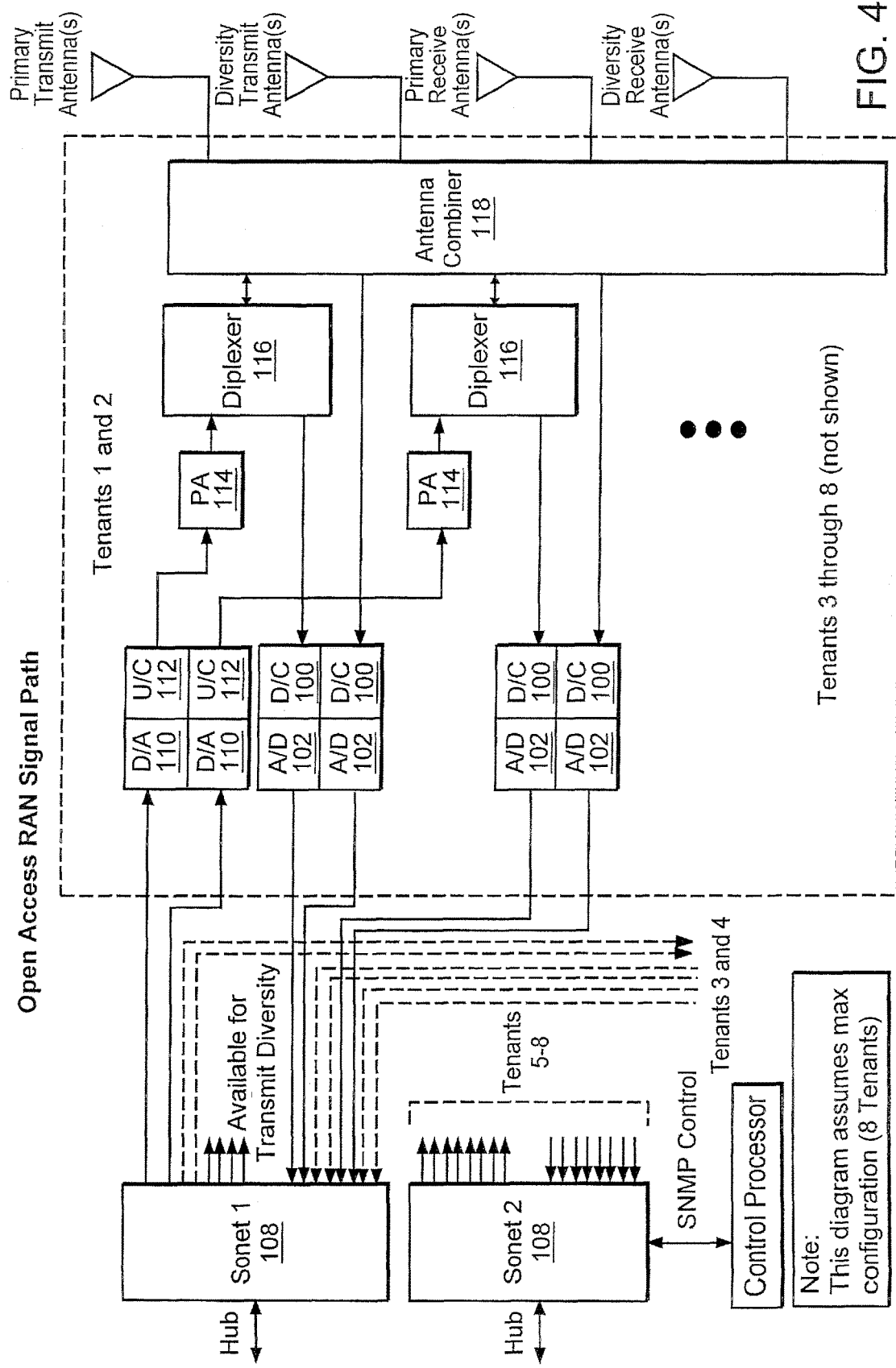
FIG. 4 is a more detailed diagram of a Radio Access Node signal path.

Referring to FIG. 4, the OC-48 signal enters a multiplexer 108 where the signal is converted from an OC-48 signal back to a STS-12 signal. The STS-12 signal is then digital-to-analog (D/A) converted to a 50 MHz (+/−7.5 MHz) signal by the D/A Channelizer 110. The 50 MHz (+/−7.5 MHz) signal is up converted 112 (U/C) to the required RF signal between. The RF signal is then power amplified (PA) 114 at its associated RF frequency and transmitted through diplexer 116 that couples transmit and receive signals to the same antenna. The RF signal is then radiated by the antenna.

Referring to FIG. 4, an RF signal is received by an antenna or antenna array and the signal is then down converted (D/C) 100 to a 50 MHz (+/−7.5 MHz) signal. The RF signal is then converted to a 14 bit stream, at least at 42.953 Msps, in the (A/D) channelizer 102. Two control bits are added to the bit stream at a digital filter implemented in a Field Programmable Gate Array (FPGA) within the A/D channelizer 102. The 16 byte stream, at least at 42.953 Msps, is serialized using 8 B/10 B encoding producing a 859 Mbps bit stream or STS-12 signal. The STS-12 signal is then combined with the other tenant signals by a 4:1 multiplexer 108 that converts the STS-12 signal to an OC-48 signal. This signal is then transmitted to the designated open access hub 35.

Referring to FIG. 3, the OC-48 signal is received at the open access hub 35 at the multiplexer 108 that converts the OC-48 signal to a STS-12 signal. The STS-12 signal is then cross-connected through interconnect 106 to a designated BTS 20. The STS-12 signal is summed up to 8, 1 with signals from other RANs in the same simulcast and is then D/A converted 110 to a 50 MHz (+/−7.5 MHz) IF signal. It should be understood that in other configurations, more than 8 signals could be summed together. The 50 MHz signal IF signal is the up converted (U/C) 112 to the desired radio carrier and forwarded to the BTS 20. Providing for two receive paths in the system 10 allows for receive diversity.

The location of the RANs will be selected to typically support radio link reliability of at least 90% area, 75% at cell edge, as a minimum, for low antenna centerline heights in a microcellular architecture. The radio link budgets, associated with each proposed tenant 70, will be a function of the selected air protocol and the RAN 50 spacing design will need to balance these parameters, to guarantee a level of coverage reliability.

Because of differences in air interface performance and mobile unit transmit powers/receive sensitivities the open access system 10 requires additional design considerations. For example, an optimal RAN location grid spacing for an IS-136 TDMA protocol is not the same as for an IS-95 CDMA protocol.

To minimize the number of RANs 50, open access multiprotocol wireless infrastructure requires that all the participating wireless protocols share common geographic transmit/receive locations. These locations are referred to as shared RANs 50, and the distance at which they can be located from any serviceable mobile unit sets the nodes' maximum separation. However, this distance limit is different for each wireless protocol due to performance differences in their respective air interface power or link budgets. A simple, but non-optimum, approach is to determine the RAN 50 locations on the wireless protocol requiring the closest spacing (i.e. smallest RF link budget). The base stations 20 located at the central hub sites 30 are then optically connected to the co-located RAN sites 50 giving each protocol the same coverage footprint per base station sector. This approach is highly non-optimum for those protocols having larger link budgets and will yield heavily overlapped coverage areas. Similarly, basing RAN spacing on the larger link budget will yield coverage gaps for the weaker link protocols.

According to the present invention, differences between the wireless protocols' link budgets are equalized through simulcasting of multiple RANs sites 50. Simulcasting allows a wireless infrastructure provider to reduce the link budget of the RAN 50 for higher power protocols to match those of the others, while increasing the net coverage range of the associated base station sectors 20. A reduction in a RANs 50 link budget (and therefore coverage range) is offset by the increase in the number of RAN's 50 that can be simultaneously served by the associated base station sectors 20. This maintains the base station 20 coverage area for the protocols with a large link budget while maintaining the closer RAN 50 spacing required for those protocols with a small link budget. At the same time, the reverse link can be brought into balance with the forward link for a wide variety of forward RF carrier power levels.

FIG. 5 shows a simplified link budget for three example collocated protocols: IS-136 (TDMA), GSM 1900 and CDMA. It should be understood that the same principles apply to other wireless air interfaces such as: PEN, GSM, 3G (GPRS/EDGE), CDMA 2000, W-CDMA, etc. The protocol with the lowest intrinsic reverse link budget (IS-136) is balanced with the CDMA protocol through the use of a larger number of RANs in the simulcast group for CDMA. All of the protocols' simulcast is also collectively scaled to balance with the forward link. For a higher-power deployment than is shown in FIG. 5 (similar to that of a large tower) the least robust air interface typically uses a simulcast of one and all other air interfaces scale up from there. Since the illustrated scenario is for is a lower power microcellular build-out, all protocols use a non-unity simulcast. The forward transmit powers for each RF carrier are properly scaled to equalize the forward link budgets of the various protocols. Call capacity per geographic area is finally established by selecting the number of RF carriers based upon the final simulcast ratio.

The determination of parameters may proceed as follows.

Forward and reverse RF link budgets are first established for each of the wireless protocols of interest. At this point, simulcast is not entered as a factor into the analysis.

The wireless protocol with the smallest link budget is then identified and its coverage area and capacity are optimized.

The system build-out, lower power (and smaller size) power amplifiers are used to minimize cost and size of the installation. Simulcast of multiple RANs 50 is used to bring the forward and reverse paths in balance for the above identified wireless protocol. This establishes the allowable RF path loss and therefore the physical spacing for the shared RANs 50.

For each of the other collocated protocols, the number RANs 50 in simulcast are selected to match the baseline link budget established above. Each protocol will have a different simulcast number. The sensitivity at each RAN 50 will change as $10\log_{10}$ (the number of RANs 50 in simulcast).

The forward transmit power levels are then adjusted to bring the forward and reverse paths into agreement.

The number of simultaneous RF carriers is selected for each protocol based upon the call capacity required in the geographic coverage area. Changing the number of carriers does not affect the link balance or the number of RANs 50 in simulcast.

Figure 6:
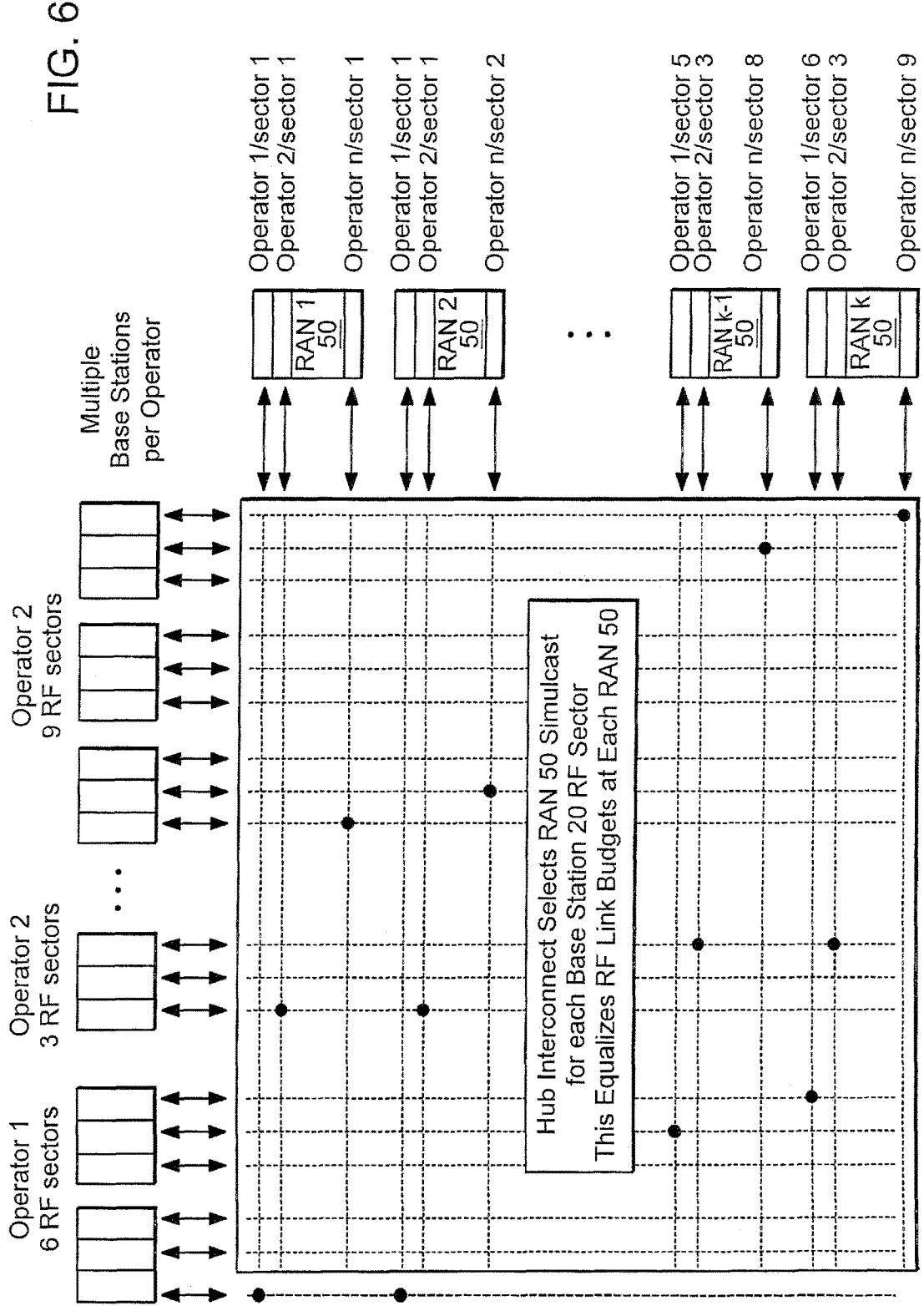
FIG. 6 is a more detailed view of a cross connect providing for the ability to connect multiple base stations for different wireless operators to a network of Radio Access Nodes.

Referring to FIG. 6, this type of infrastructure build-out requires a distributed RF system capable of cross-connecting multiple base stations 20 from different tenants or Wireless Service Providers (WSPs) to a network of RANs 50 using distribution ratios that differ for each wireless protocol. A network that does not support this aspect of the invention would simply connect the base station sectors for all the WSPs to the same complement of RANs 50. Sector 1/WSP 1 through sector 1/WSP n would all connect to the same RANs 50. Similarly, sector 2/WSP 1 through sector 2/WSP n connect to a different but common group of RANs 50.

Figure 7:
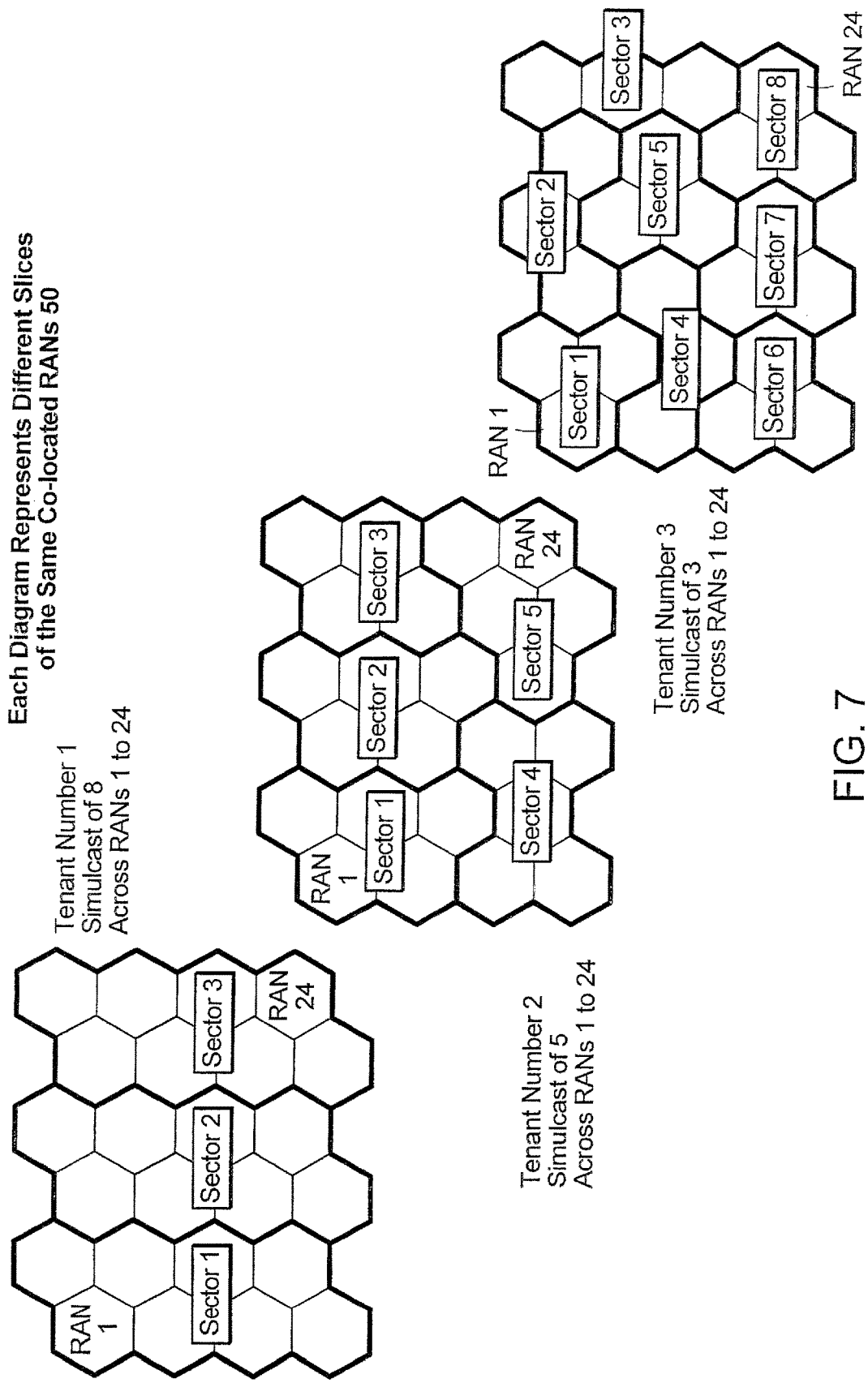
FIG. 7 is a diagram illustrating how RAN slices may be allocated to different tenants and sectors in simulcast.

Referring to FIGS. 6 and 7, the system described by this invention selects a different simulcast scheme for each individual sector of each wireless operator and the total collection of RANs 50 distributed through a geographic coverage area. For example: Sector1/WSP1 does not necessarily connect to the same complement of RANs 50 as sector 1/WSP 2 through sector 1/WSP n. There may be only partial or even no overlap between the connectivity assignments due to the variable simulcast ratios across the differing protocols. Sector 2/WSP 1 not only does not fully overlap with sector 2/(WSP 2 through n) but also may also partially overlap with sector 1/(2 though n) in RAN assignments.

Figure 8:
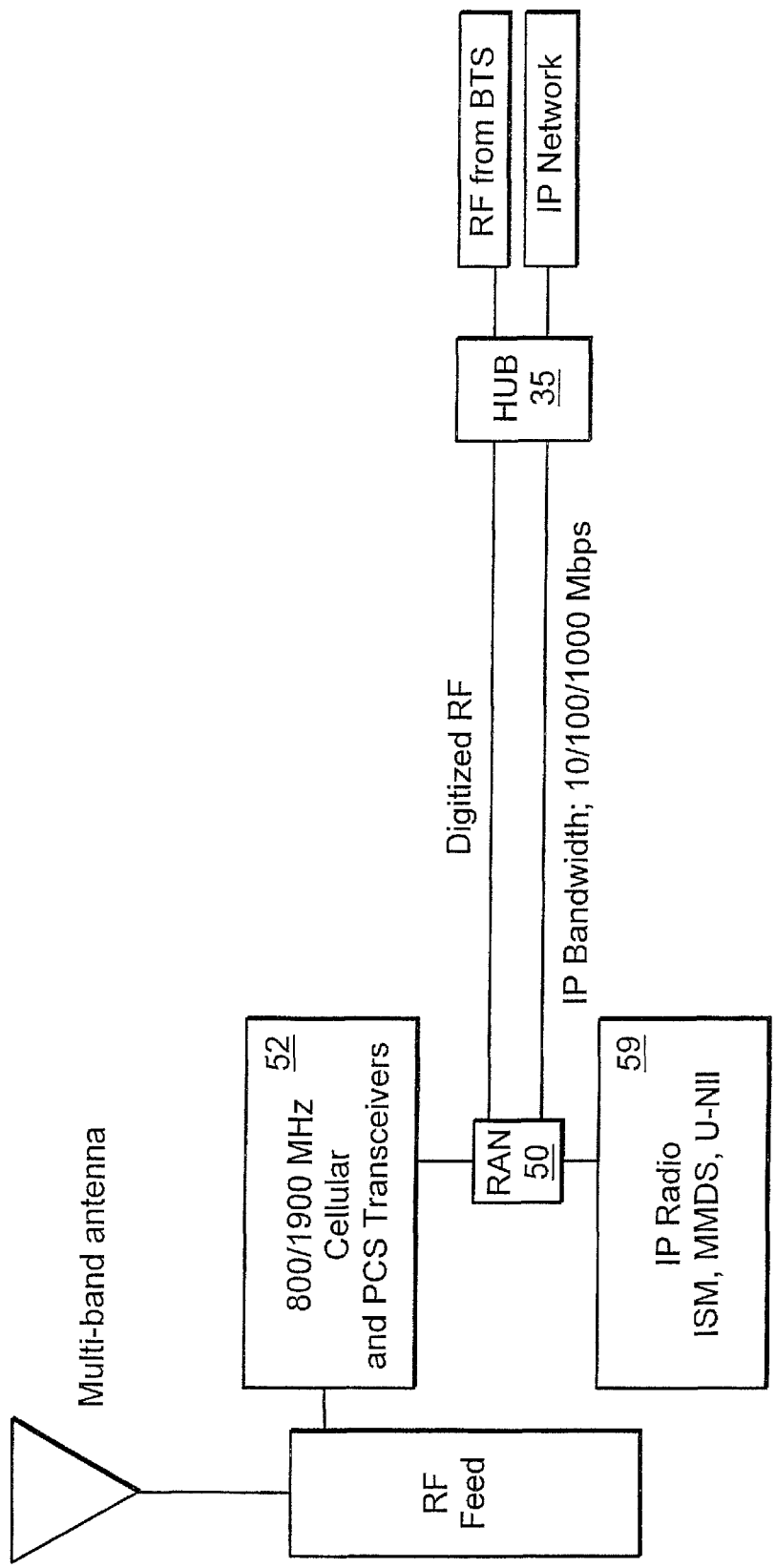
FIG. 8 is a more detailed view of one possible configuration for the hubs and RANS over which both the transport traffic signals and control signaling may be carried.

Referring in particular to the example shown in FIGS. 6 and 7, WSP or tenant 1 is operating with a CDMA protocol and therefore is simulcasting a group of 8 RANs within a total number of 24 RANs 50. Each RF sector is connected to a different grouping of 8 RANs. The illustrated drawing in FIG. 8 is for a group of 24 contiguous cells showing how the three tenants may share them.

Tenant 2 is operating with a simulcast group size of 5. Thus 5 different RANs are allocated to each of the 5 sectors for this tenant. Note that since simulcast number of 5 is not an integer divisor of the number of cells in the RAN group, that number being 24 in this example, sector 3 has only 4 cells allocated to it. Tenant 3 is operating with the simulcast group size of 3 and thus is operating with 8 sectors, each having 3 RANs associated with it.

The hub interconnect in FIG. 6 then selects RAN 50 simulcast groupings for each sector based upon the desired groupings desired for each tenant. This permits for equalization of the radio frequency link budgets in each RAN 50 group.

NMS 60 distributes individual alarms to the appropriate tenants, and maintains secure transmission for each tenant, whereas each tenant 15 is provided access to only their own respective system, for monitoring and control purposes. The open access product allows an operator to customize the RAN 50 RF parameter settings to control the radio link environment, such as signal attenuation, gain, and other methods for strong signal mitigation.

In sector configuration of the system, the Hub/RAN ratio is configurable from 1 to 8 RANs per BTS sector. The RANs 50 is remote configurable through the open access operator's NMS 60, to support what is commonly referred to as sector re-allocation. The sector allocation is defined by the hosted wireless service provider's traffic loading analysis and controlled by the inputs from the specific tenant's NMS 15 via the open access system 10 intranet 18.

The actual RAN 50 cell radius will be largely a function of final antenna radiation center above ground.

Returning attention now to FIGS. 1 and 2 briefly, in general, the data link uses one or more fiber optic connections between a hub 35 and one or more RAN's 50. Data link uses a mix of electrical multiplexing, wavelength multiplexing, and multiple fibers to support the bandwidth requirements of the configuration in a cost-effective manner. Data link design should optimize its cost by using the best combination of different multiplexing schemes based on physical fiber costs, leased fiber costs and technology evolution. Data link supports whole RF band transportation (digitized RF), IP packets, and other traffic as need for open access data transmission, system management and control.

The data link 40 connects a Hub 35 and multiple RAN's 50 using either a Ring or Star network topology, or possibly a mix of the two. In one configuration, open access system 10 should support up to, for either a ring or star topology, at least several miles of fiber length. The actual fiber lengths will be guided by optical path link budgets and specific RF protocol limits.

Referring to FIG. 8, in addition to combining digitized RF for common transport, this invention allows the combination of digitized RF with conventional packet data (e.g. IP Packets). This allows the concurrent support of packet driver wireless radios 59 co-located at the RANs with RAN slices 52, the latter which support BTSs 20. The data radios 59 do not require a BTS 20 at the hub.

The data link is available to support connecting fixed wireless data radios 59 fitted in a RAN 50 to a centrally located router in HUB site 30. In one configuration, IP packet traffic provides 10 Mbps, scalable up to 100 Mbps, to be shared amongst the multiple RAN data tenants. Networking architecture supports modularity and scalability for increased data rates. The data link supports multiple data radios at 1 to 25 Mbps data rates per data radio tenant.

Figure 9:
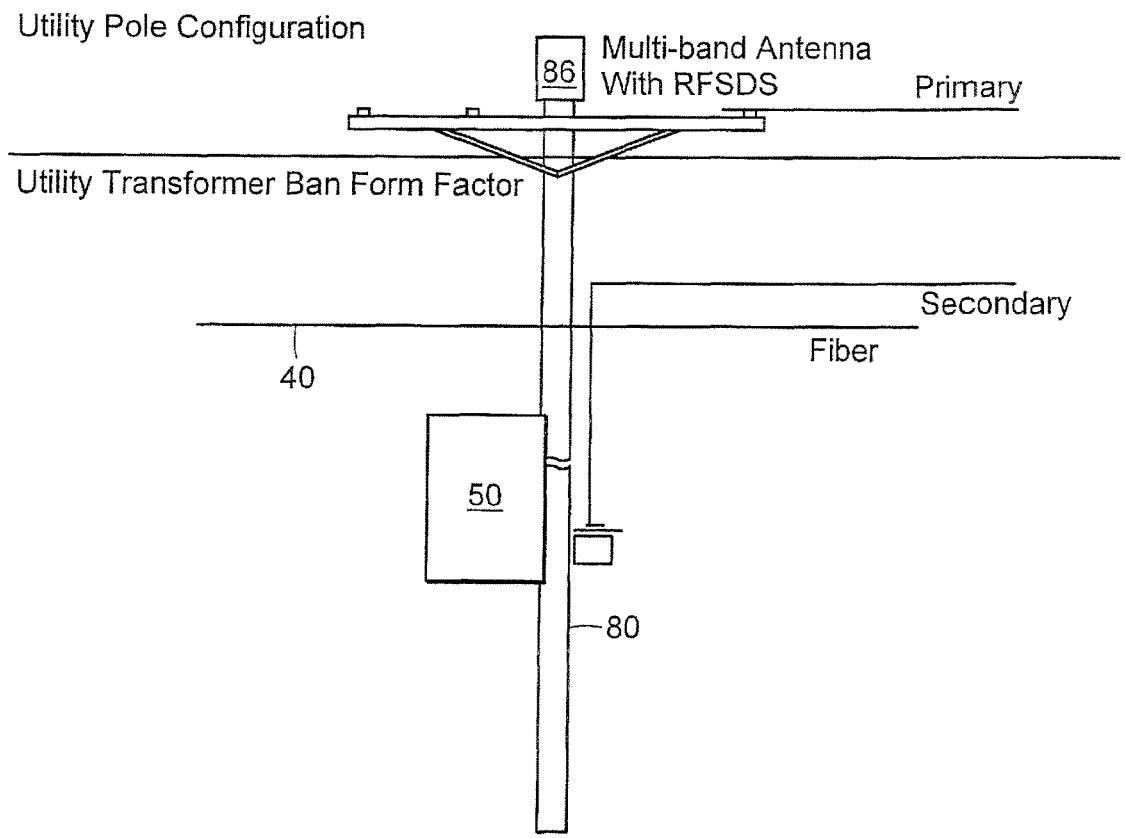
FIG. 9 is a detailed view of one possible antenna configuration.

Referring to FIG. 9, a utility pole antenna 86 is preferred as being unobtrusive and similar in dimension to the utility pole 80. Antenna 86 at least blends in with its immediate surroundings. The utility pole multi-band antenna 86 typically fits at least within a 12" diameter by 72" tall volume. The minimum pole height to the antenna base is typically at least 31 ft. agl.

In the system the multi-band antenna capability addresses 800, 1900, and at least provides volume for wireless data bands. In a preferred configuration, the antenna is multi-band and provides radiating aperture to cover all the listed bands such as, 800, 1900, WCS/ISM/MMDS and U-NII. Antenna design, antenna sizing and performance is specific for each deployment configuration.

The system configurations are modular and scalable from a single WSP application to a multi-WSP tenancy, for both the RF transceiver assemblies and the data link configurations. The system configurations have the ability to add tenants after initial install in one-tenant steps.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system comprising:
a hub unit configured to receive a plurality of downlink radio frequency (RF) carriers from a plurality of base stations via a plurality of analog downlink signals;
a plurality of radio access nodes, each of the plurality of radio access nodes located remotely from the hub unit and communicatively coupled to the hub unit;
wherein the hub unit comprises a plurality of analog-to-digital converters to produce digital versions of the analog downlink signals;
wherein the hub unit is configured to generate downlink digital data indicative of the downlink RF carriers using a plurality of channelizers;
wherein the hub unit is configured to generate the downlink digital data from the digital versions of the analog downlink signals;
wherein the hub unit is reconfigurable to selectively provide, to each of the plurality of radio access nodes, the downlink digital data associated with a respective two or more of the downlink RF carriers; and
wherein each of the plurality of radio access nodes is configured to generate, from the downlink digital data provided to that radio access node, a plurality of analog downlink RF signals using a plurality of digital-to-analog converters, wherein the plurality of analog downlink RF signals comprises the two or more downlink RF carriers associated with the downlink digital data provided to that radio access node, wherein that radio access node radiates the plurality of analog downlink RF signals in a respective coverage area associated with that radio access node.

2. The system of claim 1, wherein each channelizer in the hub unit comprises a respective digital filter.

3. The system of claim 1, wherein the hub unit comprises at least one field programmable gate array (FGPA) that implements each channelizer.

4. The system of claim 1, wherein the plurality of base stations is associated with a plurality of wireless service providers, wherein the hub unit is reconfigurable to selectively provide downlink digital data associated with more than one wireless service provider to at least one of the radio access nodes.

5. The system of claim 4, wherein the system is configured so that each wireless service provider can customize one or more RF parameters of reconstructed analog RF versions of the downlink RF carriers for that wireless service provider.

6. The system of claim 1, wherein the plurality of base stations is associated with a plurality of wireless air interfaces, wherein the hub unit is reconfigurable to selectively provide downlink digital data associated with more than one wireless air interface to at least one of the radio access nodes.

7. The system of claim 6, wherein the system is configured to process the downlink RF carriers associated with different wireless air interfaces differently.

8. The system of claim 1, wherein the hub unit comprises a reconfigurable interconnect to selectively provide, to each of the plurality of radio access nodes, the downlink digital data associated with the respective two or more of the downlink RF carriers.

9. The system of claim 1, wherein each radio access node is configured to receive a plurality analog uplink RF carriers associated with that radio access node, wherein the plurality of analog uplink RF carriers associated with that radio access node is transmitted from user equipment via one or more analog uplink signals;
wherein each radio access node is configured to generate uplink digital data indicative of the analog uplink RF carriers associated with and received at that radio access node using a plurality of channelizers;
wherein each radio access node is configured to provide, to the hub unit, the uplink digital data generated at that radio access node; and
wherein the hub unit is configured to reconstruct, from the uplink digital data provided to the hub unit from the plurality of radio access nodes, versions of the analog uplink RF carriers received at the radio access nodes and provide the versions to the base stations.

10. The system of claim 9, wherein each channelizer in each radio access node comprises a respective digital filter.

11. The system of claim 9, wherein each radio access node comprises at least one field programmable gate array (FGPA) that implements each channelizer in that radio access node.

12. The system of claim 9, wherein the plurality of analog uplink RF carriers associated with and received at a first radio access node of the plurality of radio access nodes is the same as the plurality of analog uplink RF carriers associated with and received at at least one other radio access node of the plurality of radio access nodes.

13. The system of claim 9, wherein the plurality of analog uplink RF carriers associated with and received at a first radio access node of the plurality of radio access nodes differs from the plurality of analog uplink RF carriers associated with and received at at least one other radio access node of the plurality of radio access nodes.

14. The system of claim 1, wherein the system comprises a plurality of hub units that are communicatively coupled to each other.

15. A system comprising:
a hub unit communicatively coupled to a plurality of base stations; and
a plurality of radio access nodes, each of the plurality of radio access nodes located remotely from the hub unit and communicatively coupled to the hub unit;
wherein each radio access node is configured to receive a plurality of uplink radio frequency (RF) carriers associated with that radio access node, wherein the plurality of uplink RF carriers associated with that radio access node is transmitted from user equipment via one or more analog uplink signals;
wherein each radio access node comprises a respective plurality of analog-to-digital converters to produce digital versions of the one or more analog uplink signals received at that radio access node;
wherein each radio access node is configured to generate uplink digital data indicative of the plurality of uplink RF carriers associated with and received at that radio access node using a plurality of channelizers;
wherein each radio access node is configured to generate the uplink digital data for that radio access node from the produced digital versions of the one or more analog uplink signals received at that radio access node;
wherein each radio access node is configured to provide, to the hub unit, the uplink digital data generated at that radio access node; and
wherein the hub unit is configured to generate, from the uplink digital data provided to the hub unit from the plurality of radio access nodes, a plurality of uplink base station signals associated with the plurality of uplink RF carriers received at the radio access nodes and provide the uplink base station signals to the plurality of base stations.

16. The system of claim 15, wherein each channelizer in each radio access node comprises a respective digital filter.

17. The system of claim 15, wherein each radio access node comprises at least one field programmable gate array (FGPA) that implements each channelizer in that radio access node.

18. The system of claim 15, wherein at least one of the plurality of uplink base station signals comprises an analog uplink base station signal.

19. The system of claim 15, wherein the hub unit is configured to generate the uplink base station signal associated with each of the plurality of uplink RF carriers received at the radio access nodes by summing together the uplink digital data associated with that uplink RF carrier that was received at the hub unit from one or more of the radio access nodes.

20. The system of claim 15, wherein the plurality of uplink RF carriers associated with and received at a first radio access node of the plurality of radio access nodes is the same as the plurality of uplink RF carriers associated with and received at at least one other radio access node of the plurality of radio access nodes.

21. The system of claim 15, wherein the plurality of uplink RF carriers associated with and received at a first radio access node of the plurality of radio access nodes differs from the plurality of uplink RF carriers associated with and received at at least one other radio access node of the plurality of radio access nodes.

22. A method comprising:
receiving, at a hub unit, a plurality of downlink radio frequency (RF) carriers from a plurality of base stations via a plurality of analog downlink signals;
generating digital versions of the analog downlink signals using a plurality of analog-to-digital converters of the hub unit;
generating downlink digital data indicative of the downlink RF carriers from the digital versions of the analog downlink signals using a plurality of channelizers of the hub unit;
selectively providing, to each of a plurality of radio access nodes, the downlink digital data associated with a respective two or more of the downlink RF carriers, wherein each of the plurality of radio access nodes is located remotely from the hub unit and communicatively coupled to the hub unit;
generating, for each of the plurality of radio access nodes, a plurality of analog downlink RF signals from the downlink digital data provided to that radio access node using a plurality of digital-to-analog converters of that radio access node, wherein the plurality of analog downlink RF signals comprise the two or more downlink RF carriers associated with the downlink digital data provided to that radio access node; and
radiating, for each of the plurality of radio access nodes, the plurality of analog downlink RF signals in a respective coverage area associated with that radio access node.

23. The method of claim 22, wherein each channelizer in the hub unit comprises a respective digital filter.

24. The method of claim 22, wherein the hub unit comprises at least one field programmable gate array (FGPA) that implements each channelizer.

25. The method of claim 22, wherein the plurality of base stations is associated with a plurality of wireless service providers, the method further comprising selectively providing, with the hub unit, downlink digital data associated with more than one wireless service provider to at least one of the radio access nodes.

26. The method of claim 22, wherein the plurality of base stations is associated with a plurality of wireless air interfaces, the method further comprising selectively providing, with the hub unit, downlink digital data associated with more than one wireless air interface to at least one of the radio access nodes.

27. The method of claim 26, further comprising processing the downlink RF carriers associated with different wireless air interfaces differently.

28. The method of claim 22, further comprising selectively providing, to each of the plurality of radio access nodes, the downlink digital data associated with the respective two or more of the downlink RF carriers using a reconfigurable interconnect of the hub unit.

29. The method of claim 22, further comprising:
receiving, at each radio access node, a plurality analog uplink RF carriers associated with that radio access node, wherein the plurality of analog uplink RF carriers associated with that radio access node is transmitted from user equipment via one or more analog uplink signals;
generating, at each radio access node, uplink digital data indicative of the plurality of analog uplink RF carriers associated with and received at that radio access node using a plurality channelizers;
providing, from each radio access node, the uplink digital data generated at that radio access nodes to the hub unit;
generating from the uplink digital data provided to the hub unit from the plurality of radio access nodes, a plurality of uplink base station signals associated with the plurality of uplink RF carriers received at the radio access nodes; and
providing the uplink base station signals to the plurality of base stations.

30. The method of claim 29, wherein each channelizer in each radio access node comprises a respective digital filter.

31. The method of claim 29, wherein each radio access node comprises at least one field programmable gate array (FGPA) that implements each channelizer in that radio access node.

32. The method of claim 29, wherein the plurality of analog uplink RF carriers associated with and received at a first radio access node of the plurality of radio access nodes is the same as the plurality of analog uplink RF carriers associated with and received at at least one other radio access node of the plurality of radio access nodes.

33. The method of claim 29, wherein the plurality of analog uplink RF carriers associated with and received at a first radio access node of the plurality of radio access nodes differs from the plurality of analog uplink RF carriers associated with and received at at least one other radio access node of the plurality of radio access nodes.

34. A method comprising:
receiving, at each radio access node of a plurality of radio access nodes, a plurality of uplink radio frequency (RF) carriers associated with that radio access node, wherein the plurality of uplink RF carriers associated with that radio access node is transmitted from user equipment via one or more analog uplink signals, wherein each of the plurality of radio access nodes is located remotely from and is communicatively coupled to a hub unit;

generating, for each radio access node, digital versions of the one or more analog uplink signals using a respective plurality of analog-to-digital converters; and generating, at each radio access node, uplink digital data indicative of the uplink RF carriers associated with and received at that radio access node using a respective plurality of channelizers;

generating, at each radio access node, the uplink digital data for that radio access node from the generated digital versions of the one or more analog uplink signals received at that radio access node;

providing, from each radio access node, to the hub unit, the uplink digital data generated at that radio access node;

generating, from the uplink digital data provided to the hub unit by the plurality of radio access nodes, a plurality of uplink base station signals associated with the plurality of uplink RF carriers received at the radio access nodes; and providing the uplink base station signals to a plurality of base stations.

35. The method of claim 34, wherein each channelizer in each radio access node comprises a respective digital filter.

36. The method of claim 34, wherein each radio access node comprises at least one field programmable gate array (FGPA) that implements each channelizer in that radio access node.

37. The method of claim 34, wherein at least one of the plurality of uplink base station signals comprises an analog uplink base station signal.

38. The method of claim 34, further comprising for each of the plurality of uplink RF carriers received at the radio access nodes, summing together the uplink digital data associated with that uplink RF carrier that was received at the hub unit from one or more of the radio access nodes.

39. The method of claim 34, wherein the plurality of uplink radio frequency (RF) carriers associated with and received at a first radio access node of the plurality of radio access nodes is the same as the plurality of uplink radio frequency (RF) carriers associated with and received at at least one other radio access node of the plurality of radio access nodes.

40. The method of claim 34, wherein the plurality of uplink radio frequency (RF) carriers associated with and received at a first radio access node of the plurality of radio access nodes differs from the plurality of uplink radio frequency (RF) carriers associated with and received at at least one other radio access node of the plurality of radio access nodes.

41. A hub unit comprising:
a plurality of analog-to-digital converters to produce digital versions of a plurality of analog downlink signals, wherein the hub unit is configured to receive a plurality of downlink radio frequency (RF) carriers from a plurality of base stations via the plurality of analog downlink signals;
wherein the hub unit is configured to generate downlink digital data indicative of the downlink RF carriers using a plurality of channelizers;
wherein the hub unit is configured to generate the downlink digital data from the digital versions of the analog downlink signals;
wherein the hub unit is reconfigurable to selectively provide, to each of a plurality of radio access nodes, the downlink digital data associated with a respective two or more of the downlink RF carriers;
wherein each of the plurality of radio access nodes is located remotely from the hub unit and is communicatively coupled to the hub unit; and
wherein each of the plurality of radio access nodes is configured to generate, from the downlink digital data provided to that radio access node, a plurality of analog downlink RF signals using a plurality of digital-to-analog converters, wherein the plurality of analog downlink RF signals comprises the two or more downlink RF carriers associated with the downlink digital data provided to that radio access node, wherein that radio access node radiates the plurality of analog downlink RF signals in a respective coverage area associated with that radio access node.

42. The hub unit of claim 41, wherein the plurality of base stations is associated with a plurality of wireless service providers, wherein the hub unit is reconfigurable to selectively provide downlink digital data associated with more than one wireless service provider to at least one of the radio access nodes.

43. The hub unit of claim 42, wherein the hub unit is configured so that each wireless service provider can customize one or more RF parameters of reconstructed analog RF versions of the downlink RF carriers for that wireless service provider.

44. The hub unit of claim 41, wherein the plurality of base stations is associated with a plurality of wireless air interfaces, wherein the hub unit is reconfigurable to selectively provide downlink digital data associated with more than one wireless air interface to at least one of the radio access node.

45. The hub unit of claim 44, wherein the hub unit is configured to process the downlink RF carriers associated with different wireless air interfaces differently.

46. A radio access node comprising:
a plurality of analog-to-digital converters to produce digital versions of one or more analog uplink signals, wherein the radio access node is configured to receive a plurality of uplink radio frequency (RF) carriers transmitted from user equipment via the one or more analog uplink signals;
wherein the radio access node is configured to generate uplink digital data indicative of the uplink RF carriers received at the radio access node using a plurality of channelizers;
wherein the radio access node is configured to generate the uplink digital data from the produced digital versions of the one or more analog uplink signals received at the radio access node;
wherein the radio access node is configured to provide the uplink digital data generated at the radio access node to a hub unit located remotely from the radio access node and communicatively coupled to the radio access node; and
wherein the hub unit is configured to generate, at least in part from the uplink digital data provided to the hub unit from the radio access node, a plurality of uplink base station signals associated with the plurality of uplink RF carriers received at the radio access node and provide the uplink base station signals to base stations communicatively coupled to the hub unit.

47. The radio access node of claim 46, wherein each channelizer in the radio access node comprises a respective digital filter.

48. The radio access node of claim 46, wherein the radio access node comprises at least one field programmable gate array (FGPA) that implements each channelizer in the radio access node.

49. The radio access node of claim 46, wherein the plurality of uplink base station signals comprise a plurality of analog uplink base station signals.

50. A system comprising:
at least one base unit; and
a plurality of radio access nodes, each of the plurality of radio access nodes located remotely from the at least one base unit and communicatively coupled to the at least one base unit;
wherein each radio access node is configured to receive a plurality of uplink radio frequency (RF) carriers associated with that radio access node, wherein the plurality of uplink RF carriers associated with that radio access node is transmitted from user equipment via one or more analog uplink signals;
wherein each radio access node comprises a respective plurality of analog-to-digital converters to produce digital versions of the one or more analog uplink signals received at that radio access node;
wherein each radio access node is configured to generate uplink digital data indicative of the plurality of uplink RF carriers associated with and received at that radio access node using a plurality of channelizers;
wherein each radio access node is configured to generate the uplink digital data for that radio access node from the produced digital versions of the respective one or more analog uplink signals received at that radio access node;
wherein each radio access node is configured to provide, to the at least one base unit, the uplink digital data generated at that radio access node; and
wherein the at least one base unit is configured to perform base station processing for the user equipment using information derived from the uplink digital data provided to the at least one base unit from the plurality of radio access nodes.

51. The system of claim 50, wherein each channelizer in each radio access node comprises a respective digital filter.

52. The system of claim 50, wherein each radio access node comprises at least one field programmable gate array (FGPA) that implements each channelizer in that radio access node.

53. The system of claim 50, wherein the plurality of uplink radio frequency (RF) carriers associated with and received at a first radio access node of the plurality of radio access nodes is the same as the plurality of uplink radio frequency (RF) carriers associated with and received at at least one other radio access node of the plurality of radio access nodes.

54. The system of claim 50, wherein the plurality of uplink radio frequency (RF) carriers associated with and received at a first radio access node of the plurality of radio access nodes differs from the plurality of uplink radio frequency (RF) carriers associated with and received at at least one other radio access node of the plurality of radio access nodes.

55. A method comprising:
receiving, at each radio access node of a plurality of radio access nodes, a plurality of uplink radio frequency (RF) carriers associated with that radio access node, wherein the plurality of uplink RF carriers associated with that radio access node is transmitted from user equipment via one or more analog uplink signals, wherein each of the plurality of radio access nodes is located remotely from and is communicatively coupled to at least one base unit;
generating, for each radio access node, digital versions of the one or more analog uplink signals using a respective plurality of analog-to-digital converters; and
generating, at each radio access node, uplink digital data indicative of the uplink RF carriers associated with and received at that radio access node using a respective plurality of channelizers;
generating, at each radio access node, the uplink digital data for that radio access node from the generated digital versions of the one or more analog uplink signals received at that radio access node;
providing, from each radio access node, to the at least one base unit, the uplink digital data generated at that radio access node; and
performing base station processing for the user equipment using information derived from the uplink digital data provided to the at least one base unit by the plurality of radio access nodes.

56. The method of claim 55, wherein each channelizer in each radio access node comprises a respective digital filter.

57. The method of claim 55, wherein each radio access node comprises at least one field programmable gate array (FGPA) that implements each channelizer in that radio access node.

58. The method of claim 55, wherein the plurality of uplink radio frequency (RF) carriers associated with and received at a first radio access node of the plurality of radio access nodes is the same as the plurality of uplink radio frequency (RF) carriers associated with and received at at least one other radio access node of the plurality of radio access nodes.

59. The method of claim 55, wherein the plurality of uplink radio frequency (RF) carriers associated with and received at a first radio access node of the plurality of radio access nodes differs from the plurality of uplink radio frequency (RF) carriers associated with and received at at least one other radio access node of the plurality of radio access nodes.

60. A radio access node comprising:
a plurality of analog-to-digital converters to produce digital versions of one or more analog uplink signals, wherein the radio access node is configured to receive a plurality of uplink radio frequency (RF) carriers transmitted from user equipment via the one or more analog uplink signals;
wherein the radio access node is configured to generate uplink digital data indicative of the uplink RF carriers received at the radio access node using a plurality of channelizers;
wherein the radio access node is configured to generate the uplink digital data from the produced digital versions of the one or more analog uplink signals received at the radio access node;
wherein the radio access node is configured to provide the uplink digital data generated at the radio access node to a base unit located remotely from the radio access node and communicatively coupled to the radio access node; and
wherein the base unit is configured to perform base station processing for the user equipment using information derived from the uplink digital data provided to the base unit.

61. The radio access node of claim 60, wherein each channelizer in the radio access node comprises a respective digital filter.

62. The radio access node of claim 60, wherein the radio access node comprises at least one field programmable gate array (FGPA) that implements each channelizer in the radio access node.

* * * * *